US008958910B2

(12) United States Patent
Ichinose et al.

(10) Patent No.: US 8,958,910 B2
(45) Date of Patent: Feb. 17, 2015

(54) ELEVATOR SYSTEM THAT AUTONOMOUS MOBILE ROBOT TAKES TOGETHER WITH PERSON

(75) Inventors: Ryoko Ichinose, Tsukuba (JP); Ikuo Takeuchi, Kasumigaura (JP); Takashi Teramoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 13/177,789

(22) Filed: Jul. 7, 2011

(65) Prior Publication Data

US 2012/0041593 A1 Feb. 16, 2012

(30) Foreign Application Priority Data

Jul. 8, 2010 (JP) ................................ 2010-155925

(51) Int. Cl.
*G05B 15/00* (2006.01)
*G05B 19/00* (2006.01)
*B66B 1/24* (2006.01)

(52) U.S. Cl.
CPC .................................... *B66B 1/2458* (2013.01)
USPC ............................ 700/258; 700/257; 700/259

(58) Field of Classification Search
CPC ............................... B66B 1/2458; B25J 13/08
USPC .......................... 700/245, 257, 258, 259, 264
See application file for complete search history.

(56) References Cited

U.S. PATENT DOCUMENTS 5,679,932 A * 10/1997 Kim .............................. 187/382
6,328,135 B1 * 12/2001 Sirag et al. .................... 187/382
6,394,232 B1 * 5/2002 Iwata et al. ................... 187/382
7,360,629 B2 * 4/2008 Hagi et al. .................... 187/249
7,742,840 B2 * 6/2010 Watabe et al. ................ 700/253
7,933,684 B2 * 4/2011 Sugino et al. ................. 700/245
8,376,090 B2 * 2/2013 Kostka .......................... 187/281
2006/0129276 A1 * 6/2006 Watabe et al. ................ 700/245
2006/0217838 A1 * 9/2006 Sugino et al. ................. 700/245
2007/0271011 A1 * 11/2007 Lee et al. ........................ 701/25
2009/0216376 A1 * 8/2009 Atalla et al. .................. 700/275

FOREIGN PATENT DOCUMENTS

JP 07257829 A * 10/1995
JP 2001-114479 4/2001
JP 2003-081544 3/2003

(Continued)

OTHER PUBLICATIONS

JP07257829A_English_Machine_Translation.*
JP2003081544A_English_Machine_Translation.*
JP2005018382A_English_Machine_Translation.*
JP2009126675A_English_Machine_Translation.*
JP2005306584A_English_Machine_Translation.*
Crites, Elevator Group Control Using Multiple Reinforcement Learning Agents, 1998.*
Kang, Navigation Strategy for the Service Robot in the Elevator Environment, 2007.*
Japanese Office Action mailed on Oct. 31, 2012, in corresponding Japanese Application No. 10-2011-67213.
Korean Office Action mailed on Oct. 31, 2012, in corresponding Korean Application No. 10-2011-67213.

*Primary Examiner* — Jason Holloway
*Assistant Examiner* — Rachid Bendidi
(74) *Attorney, Agent, or Firm* — Antonelli, Terry, Stout & Kraus, LLP.

(57) ABSTRACT

An elevator system which an autonomous mobile robot and human user can utilize safely and efficiently. The system has an available area detection unit to detect an available area in a cage, and a riding possibility/impossibility determination unit to determine whether or not the autonomous mobile robot can get on the cage based on information on size and position of the available area detected by the available area detection unit. The autonomous mobile robot gets on the cage only when the riding possibility/impossibility determination unit determines that riding is possible.

13 Claims, 23 Drawing Sheets

(56) References Cited

FOREIGN PATENT DOCUMENTS

| | | | | |
|---|---|---|---|---|
| JP | 2003081544 | A | * | 3/2003 |
| JP | 2005-018382 | | | 1/2005 |
| JP | 2005018382 | A | * | 1/2005 |
| JP | 2005306584 | A | * | 11/2005 |
| JP | 2009-051617 | | | 3/2009 |
| JP | 2009126675 | A | * | 6/2009 |
| JP | 2010-287016 | | | 12/2010 |
| JP | 2011-88721 | | | 5/2011 |

* cited by examiner

ELEVATOR SYSTEM THAT AUTONOMOUS MOBILE ROBOT TAKES TOGETHER WITH PERSON

CLAIM OF PRIORITY

The present application claims priority from Japanese patent application serial no. 2010-155925 filed on Jul. 8, 2010, the content of which is hereby incorporated by reference into this application.

BACKGROUND OF THE INVENTION

The present invention relates to an elevator system that an autonomous mobile robot takes with person(s).

DESCRIPTION OF RELATED ART

In recent years, an autonomous mobile robot which performs tasks such as conveyance of goods, cleaning and guidance while moving within human life space, i.e., a so-called human symbiotic robot, has been developed. There is a high probability that a mobile unit for the robot to move through rooms becomes a future significant development point.

For example, when the tasks are to be performed on multiple floors of e.g. a building, the mobile unit is required for movement to another floor. As such mobile unit to move to another floor, stair steps, escalators or elevators are used. However, in use of stair steps, it is necessary to provide the robot with a very complicated mechanism to move up and down by each narrow step. Further, in use of an escalator, as timing control upon getting on/off is very difficult, it is necessary to keep the attitude of the robot not to fall from a narrow step. Accordingly, a complicated mechanism is also required, and further, there are problems in the point of safety.

On the other hand, in use of an elevator, since it is possible for the robot to get on/off merely by horizontal movement on a flat surface, the getting on/off movement can be realized with the same mechanism as that upon movement through passageways and rooms. Accordingly, the elevator is most appropriate as an ascent/descent unit for the robot.

Note that the cage of the elevator is closed space, and when an elevator for human users is also used for the robot's moving, it is very important to ensure safety for human users.

For example, Japanese Published Unexamined Patent Application No. 2009-51617 discloses a structure in which, to ensure safety, one of driving controller specialized for human users and driving controller specialized for robots is selected so as to avoid simultaneous use of one cage by both robot and human users.

More particularly, the former unit performs control to prevent robots from getting on the cage, and the latter unit prevents human users from getting on the cage by announcement of non-available status for human users or tuning off lights. Even when a person erroneously gets on, destination floor buttons are invalidated, thus the person is urged to get off.

Further, Japanese Published Unexamined Patent Application No. 2001-114479 relates an elevator controller for simultaneous riding for both robot and human user in one cage.

As described in Japanese Published Unexamined Patent Application No. 2009-51617, in a system to avoid simultaneous riding for both robot and human user in the cage, the robot's waiting time is long and carriage efficiency is low. Accordingly, the robot operational efficiency and the user-friendliness for human users are lowered.

On the other hand, according to Japanese Published Unexamined Patent Application No. 2001-114479, the elevator controller is provided for simultaneous riding for both robot and human user, however, there is no description on safety when the number of human users is large. When there are many users, there is a possibility that space for the robot is not ensured in the cage.

SUMMARY OF THE INVENTION

The present invention has been made in consideration of the above situation, and provides an elevator system that autonomous mobile robot take together with person, which realizes safe simultaneous riding for robot and human user, and even when there are many users, prevents reduction of robot operational efficiency and reduction of user-friendliness for human users.

According to the present invention, the foregoing object is attained by providing an elevator system that autonomous mobile robot takes together with person, comprising: an autonomous mobile robot having: a self position recognition unit that recognizes a current self position; a mobile unit that generates a route to a destination based on self position information recognized by the self position recognition unit and moves by driving a mobile mechanism; and an autonomous mobile controller that controls respective units in the autonomous mobile robot; and an elevator having: a cage ascent/decent unit that moves a cage up/down; a door that opens/closes an entrance of the cage; a designation floor designation unit that designates a destination of the cage; a calling-out unit that calls out the cage to a floor designated by the destination floor designation unit; an elevator controller that control respective units of the elevator, a communication unit that transmits/receives information including at least one of designated floors as a destination of the autonomous mobile robot; an available area detection unit that detects an available area in the cage; and a riding possibility/impossibility determination unit that determines whether or not the autonomous mobile robot can get on the cage based on information on size and position of the available area detected by the available area detection unit, wherein the autonomous mobile robot gets on the cage only when the riding possibility/impossibility determination unit determines that riding is possible.

Further, the above-described elevator system further comprises: a getting on/off status detection unit that always detects detailed positional status of the autonomous mobile robot when the autonomous mobile robot moves to get on/off the cage. When the autonomous mobile robot is in a door opening/closing position, the elevator controller controls a door opening/closing unit not to close the door based on information from the getting on/off status detection unit.

Further, in the above-described elevator system, the getting on/off status detection unit always detects the details positional status of the autonomous mobile robot even when the cage is moved up, and when it is determined that the position of the autonomous mobile robot is changed based on the information from the getting on/off status detection unit while the cage is moved up, the elevator controller controls the cage ascent/descent unit to stop the cage at the closest floor, and then open the door at the closest floor.

Further, in the above-described elevator system, a moving suppression unit that suppresses movement of the autonomous mobile robot is provided in the cage, and the moving suppression unit suppresses movement of the autonomous mobile robot while the cage is moved up.

Further, in the above-described elevator system, the moving suppression unit performs start of movement suppression and release of movement suppression by opening/closing operation of the door.

Further, in the above-described elevator system, the moving suppression unit performs the start of movement suppression and the release of movement suppression by an upward/downward acceleration/deceleration force of the cage.

Further, in the above-described elevator system, when a plurality of elevators are arrayed and a calling-out request from the autonomous mobile robot and a calling-out request by the calling-out unit occur on the same floor, the elevator controller controls the cage ascent/descent unit to move a plurality of cages to arrive at a corresponding floor almost simultaneously, and the autonomous mobile robot gets on one of the cages that arrives behind.

Further, in the above-described elevator system, at least one priority is set for a calling-out request and destination floor designation for the autonomous mobile robot, the calling-out request by the calling-out unit and the destination floor designation by the destination floor designation unit. When the priority of the calling-out request by the calling-out unit or the destination floor designation by the destination floor designation unit is higher than the priority of the calling-out request or the destination floor designation for the autonomous mobile robot, the autonomous mobile robot does not get on the cage.

Further, in the above-described elevator system, any one or both of the calling-out unit and the destination floor designation unit are push buttons, and a priority detection unit that detects the number of continuous depression times of the push button is provided. Further, the priority of the calling-out request or the destination floor designation is designated based on the number of continuous depression times detected by the priority detection unit.

Further, in the above-described elevator system, when the riding possibility/impossibility determination unit does not determine that riding is possible within a predetermined period, it is determined that the riding is impossible and the autonomous mobile robot cancels riding. Further, a riding failures storage unit that stores the number of riding failures is provided, and a control method for any one or both of the elevator controller and the autonomous movement controller is changed to a control method to increase a possibility that the riding area for the autonomous mobile robot can be ensured based on the number of riding failures from the riding failures storage unit.

According to the present invention, it is possible to provide an elevator system that an autonomous mobile robot takes with person(s) to realize safe simultaneous riding for robot and human, and even when there are many users, prevent reduction of the robot's operational efficiency and reduction of user-friendliness for human users.

BRIEF DESCRIPTION OF THE DRAWINGS

The above and other object, features and advantages of the present invention will become more apparent from the following detailed description when taken in conjunction with the accompanying drawings wherein.

DETAILED DESCRIPTION OF THE PREFERRED EMBODIMENTS

Hereinbelow, an embodiment of the present invention will be described in accordance with the accompanying drawings.

Embodiment 1

Figure 1:
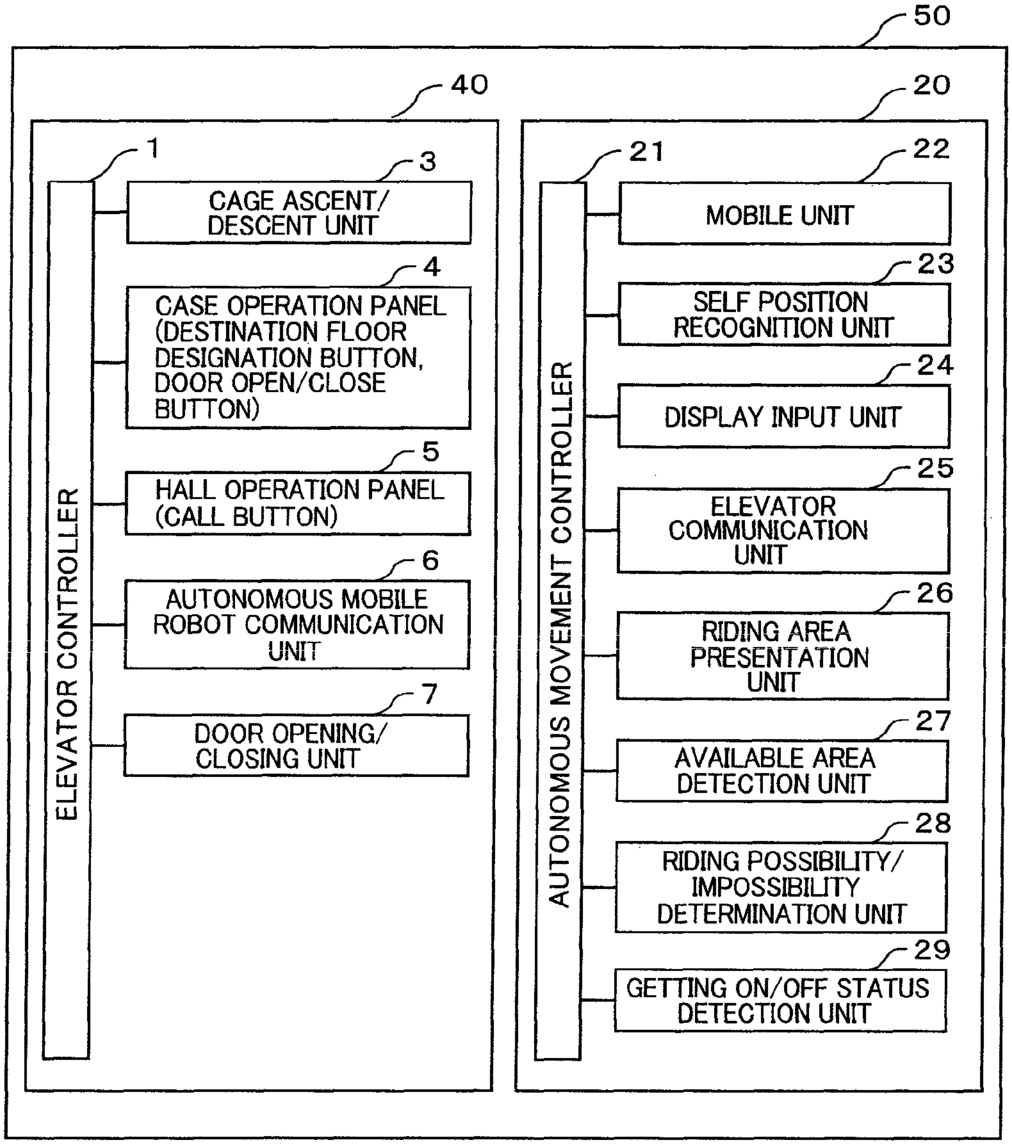
FIG. 1 is a block diagram showing a configuration of an elevator system according to an embodiment of the present invention.

FIG. 1 is a block diagram showing a configuration of an elevator system according to an embodiment of the present invention.

Figure 2:
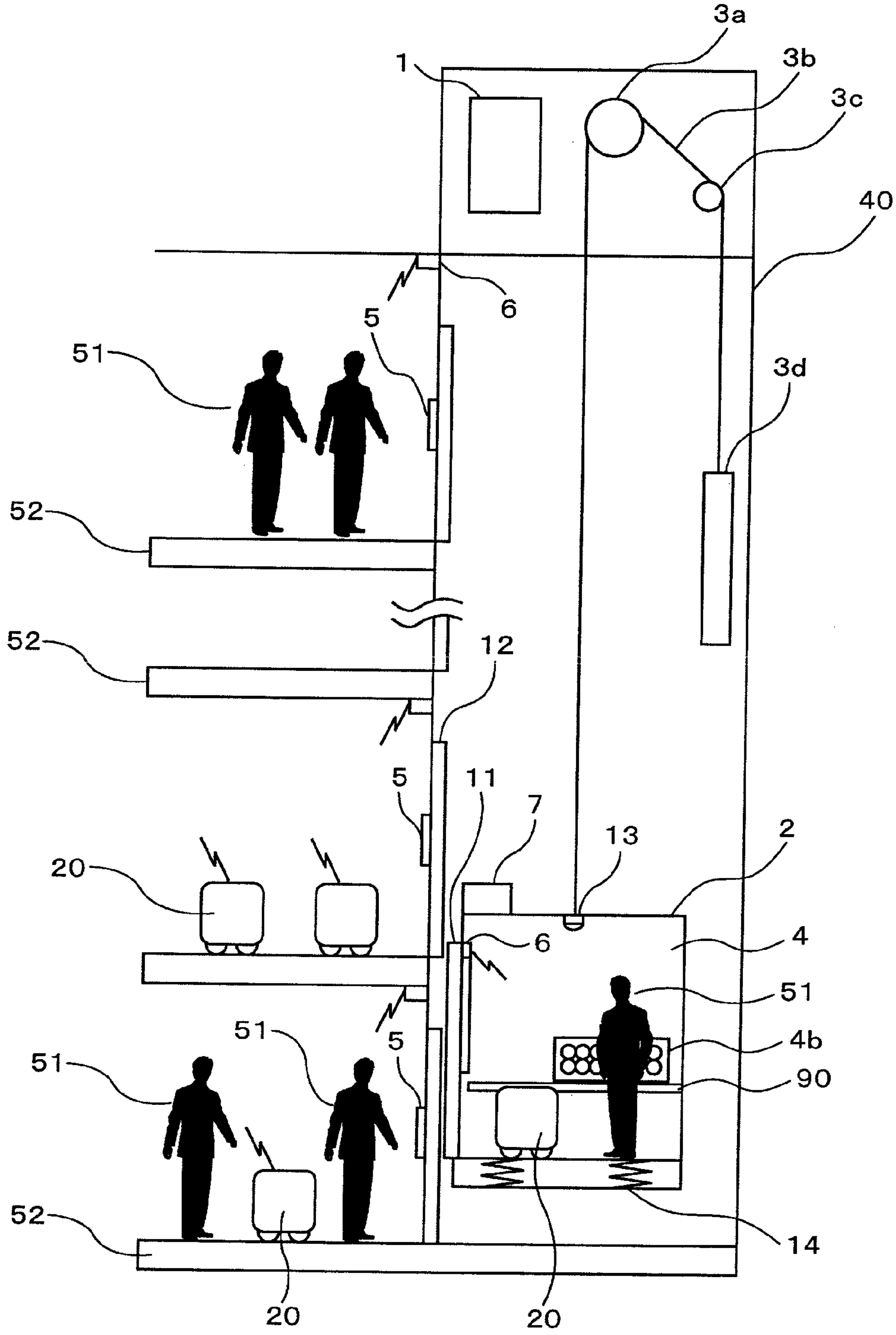
FIG. 2 is a schematic cross-sectional view showing the configuration of the elevator system according to the embodiment of the present invention.

FIG. 2 is a schematic cross-sectional view showing the configuration of the elevator system according to the embodiment of the present invention.

Figure 3:
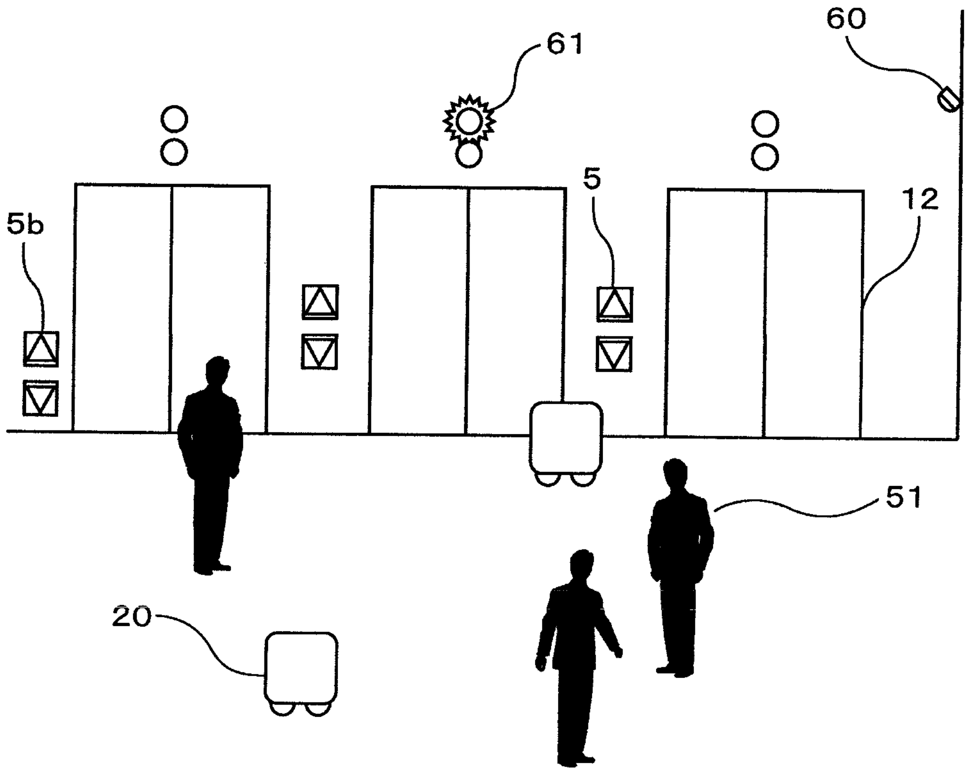
FIG. 3 illustrates a layout of an elevator hall of the elevator system according to the embodiment of the present invention.

FIG. 3 illustrates a layout of an elevator hall of the elevator system according to the embodiment of the present invention.

In FIG. 1, reference numeral 50 denotes an elevator system having an elevator 40 and an autonomous mobile robot 20. The elevator 40 is formed by providing a general elevator having a cage ascent/descent unit 3, a cage operation panel 4, a hall operation panel 5 and a door opening/closing unit 7 with a communication unit for communication with the autonomous mobile robot 20.

Next, the elevator 40 will be described using the schematic cross-sectional view of FIG. 2 showing the configuration of the elevator system and the diagram showing the layout of the elevator hall of the elevator system of FIG. 3.

In FIG. 2, numeral 1 denotes an elevator controller to control the following respective units provided in the elevator 40. Numeral 2 denotes a cage for user(s) and the autonomous mobile robot 20 to ride and move to a target floor. The cage 2 is moved up and down with the cage ascent/descent unit 3 (shown in FIG. 1) having a lifting gear 3*a*, a rope 3*b*, a deflector wheel 3*c*, a balance weight and the like.

When a user 51 makes calling out for the cage 2 using the hall operation panel 5 provided on each floor 52, the elevator controller 1 controls the cage ascent/descent unit 3 to move the cage 2 to the calling-out floor. The cage 2 has a cage door 11 at its entrance/exit. When the cage 2 arrives at the calling-out floor, the cage door 11, interlocked with a hall door 12, is opened/closed by a door opening/closing unit 7. Upon arrival, a cage arrival advance lamp 61 (shown in FIG. 3) attached around the hall door of the elevator is turned on. In the hall operation panel 5, an upward or downward destination direction is designated upon calling-out, and the elevator controller 1 sends the cage in the designated direction to the calling-out floor, then the cage arrival advance lamp 61 in the destination direction is turned on.

The cage operation panel 4, provided in the cage 2, is used for designation of a destination floor by the user 51 who got on the cage. There is a cage 2 having a cage operation panel 4*b* attached to a lower position and a hand rail 90 for a user in a wheelchair. Further, in the elevator hall, a hall operation panel 5*b* (shown in FIG. 3) is attached to a lower position, and when a call-out is made with this hall operation panel 5*b*, the elevator controller 1 sends the cage having the cage operation panel 4*b* to the corresponding floor.

The hall operation panel 5 is provided with button type switches respectively indicating upward and downward destination directions, and the cage operation panel 4 is provided with button type switches respectively indicating destination floors. A depressed switch is lighted for representation of the depressed state.

The cage 2 is also provided with a weight sensor 14, and is capable of measuring an approximate deadweight. Numeral 13 denotes a monitor camera attached around the ceiling of the cage. The elevator hall is also provided with a monitor camera 60.

Numeral 6 denotes a communication unit for communication with the autonomous mobile robot 20. Through communication from the autonomous mobile robot 20, information on a calling request and destination floor designation can be received. When multiple autonomous mobile robots 20 operate, to identify the autonomous mobile robot 20 that sent information, autonomous mobile robot identification information is also received. Further, riding permission/prohibition information with respect to a particular cage is transmitted to the autonomous mobile robot 20.

The autonomous mobile robot 20 in FIG. 1 performs tasks such as article conveyance and guest guidance. Numeral 21 denotes an autonomous movement controller to control various units of the autonomous mobile robot 20. Numeral 22 denotes a mobile unit having a motor and wheels. Numeral 23 denotes a self position recognition unit to recognize its own position using a sensor such as a motor encoder. By integrating the numbers of pulses from the motor encoders at the respective wheels, the amount of movement from a departure position and the amount of rotation are obtained and the current position is estimated. Further, a laser scanner or a stereo camera may be used. An external map is previously generated by sensing with the respective sensors, then data obtained by sensing while the robot was moving is compared with the map data, and a corresponding site is estimated as the current position. For example, when the laser scanner is used, as the distance to a material around some flat surface can be measured. Accordingly, a shape map of the surroundings of the flat surface is previously made, then a shape obtained by scanning while the robot was moving is compared with the scanned shape and a corresponding point is detected. As the stereo camera obtains two-dimensional color information and width information, an external map of three-dimensional shape and color information is previously made. Then color information and width information are obtained while the robot is moving, then compared with the external map, and a corresponding point is detected. In this manner, the self position is estimated.

Numeral 24 denotes a display input unit having e.g. a liquid crystal display and a touch panel. For example, upon conveyance job, a map is displayed so that a user designates a destination by touching the screen. Then the autonomous mobile robot 20 compares the destination inputted at the display input unit 24 with the self position obtained as needed with the self position recognition unit 23, to determine a route. Then the autonomous mobile robot 20 drives the mobile unit 22 to move in accordance with the route. These units are provided in a general autonomous mobile robot 20.

In addition to these units, the autonomous mobile robot 20 according to the present invention has the following units.

Numeral 25 denotes an elevator communication unit to communicate with the autonomous mobile robot communication unit 6 in the elevator 40, and transmit information on a calling-out request for the cage and destination floor designation to the elevator controller 1. Further, the elevator communication unit 25 receives riding permission/prohibition information to a particular cage from the elevator controller 1. When riding permission information is received, the autonomous movement controller 21 controls the autonomous mobile unit 20 to perform a riding operation with respect to the designated cage. When riding prohibition information is received, the autonomous movement controller 21 controls the autonomous mobile unit 20 not to perform the riding operation with respect to the designated cage.

In the button type switches of the hall operation panel 5 and the cage operation panel 4 shown in FIG. 2, when a button is depressed, a lamp included in the depressed button is turned on so as to indicate the depressed state. However, when a calling-out request or destination floor designation is obtained by the communication from the autonomous mobile robot 20, the button type switch of the hall operation panel 5 and the cage operation panel 4 is not turned on. Since users do not press an already ON switch, if the corresponding switch is turned on, the user's requirement cannot be obtained.

When a calling-out request or destination floor designation is obtained by the communication from the autonomous mobile robot 20, as the corresponding button is not turned on, the user performs a key depression operation to indicate his/her requirement even if the requirements from the autonomous mobile robot 20 and the user's requirement are the same. It is expected that the user's requirement can be detected in addition to the requirement from the autonomous mobile robot 20. However, when the user knows the destination floor for the autonomous mobile robot 20, the user might make room for the autonomous mobile robot 20 when it gets off. Accordingly, it may be arranged such that a destination floor is displayed on the display input unit 24 of the autonomous mobile robot 20.

Numeral 26 denotes a riding area presentation unit. The riding area presentation unit 26 previously indicates a moving range of the autonomous mobile robot 20, so as to make room for the autonomous mobile robot 20 by the people around the robot, or to adjust the riding position of the autonomous mobile robot 20 to avoid contact with the people.

In FIG. 1, the riding area presentation unit 26 is provided in the autonomous mobile robot 20, however, the riding area presentation unit 26 may be provided in the elevator 40.

Next, a particular method will be described in FIG. 4.

Figure 4:
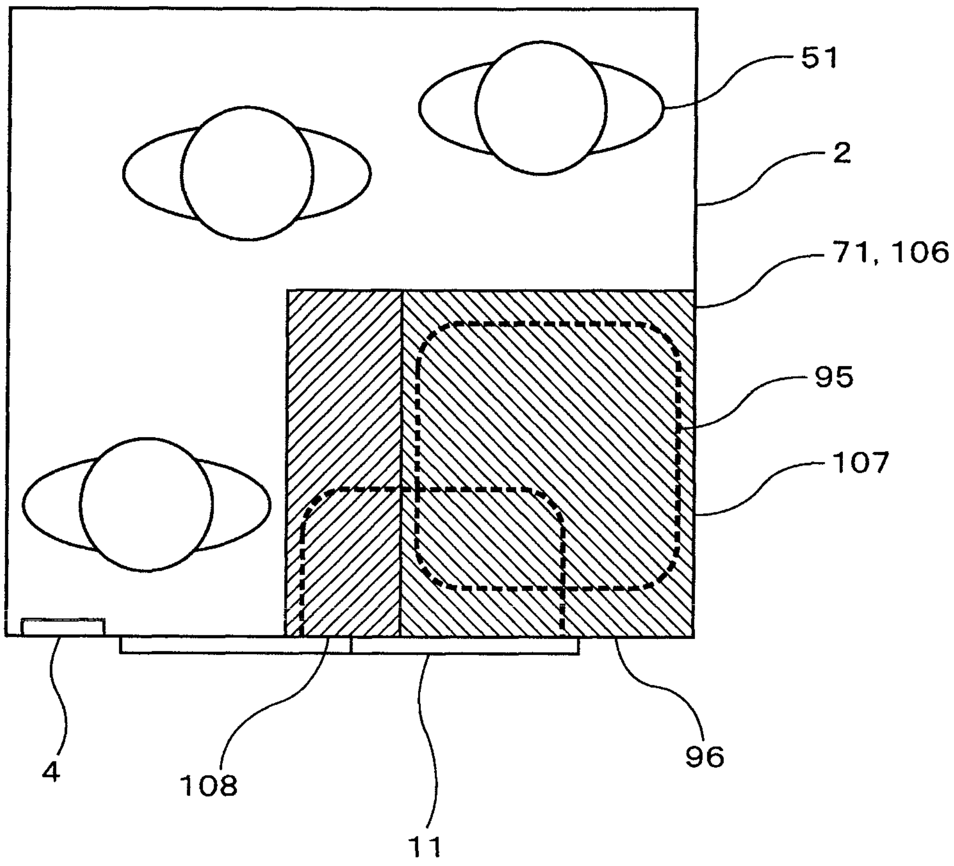
FIG. 4 illustrates an example of presentation of a riding area of an autonomous mobile robot according to the embodiment of the present invention.

FIG. 4 illustrates an example of presentation of an autonomous mobile robot riding area according to the embodiment of the present invention.

In FIG. 4, the colored part of the floor within the riding area is presented as a riding area 106. Numeral 71 denotes presented autonomous mobile robot riding area. In FIG. 4, the riding area 106, hatched with left diagonal lines, and the presented autonomous mobile robot riding area 71, hatched with right diagonal lines, are the same. The riding area 106 includes a riding position 107 in which the autonomous mobile robot 20 is to stop while the cage 20 is moving upward and a passage area to the riding position 107.

In FIG. 4, the riding position 107 is hatched with right diagonal lines and the passage area 108, with left diagonal lines, however, a part of the passage area overlapped with the riding position 107 is not shown.

As the riding position 107, an area is obtained by adding a predetermined marginal area to a floor projected area of the autonomous mobile robot 20. The passage area is obtained by adding a marginal area to the width of the autonomous mobile robot 20.

The position of the autonomous mobile robot 20 passing through the entrance/exit of the cage is approximately a position indicated with a broken line 96 in FIG. 4. The position in which the autonomous mobile robot 20 is to stop during the upward movement of the cage 2 is approximately a position indicated with a broken line 95 in FIG. 4.

The riding position 107 is away from at least one cage operation panel 4 so that a user can use at least one cage operation panel 4. Further, the riding position 107 is set as a position to ensure space for the user to go through the entrance/exit for the sake of the user's get-on/off.

Figure 5:
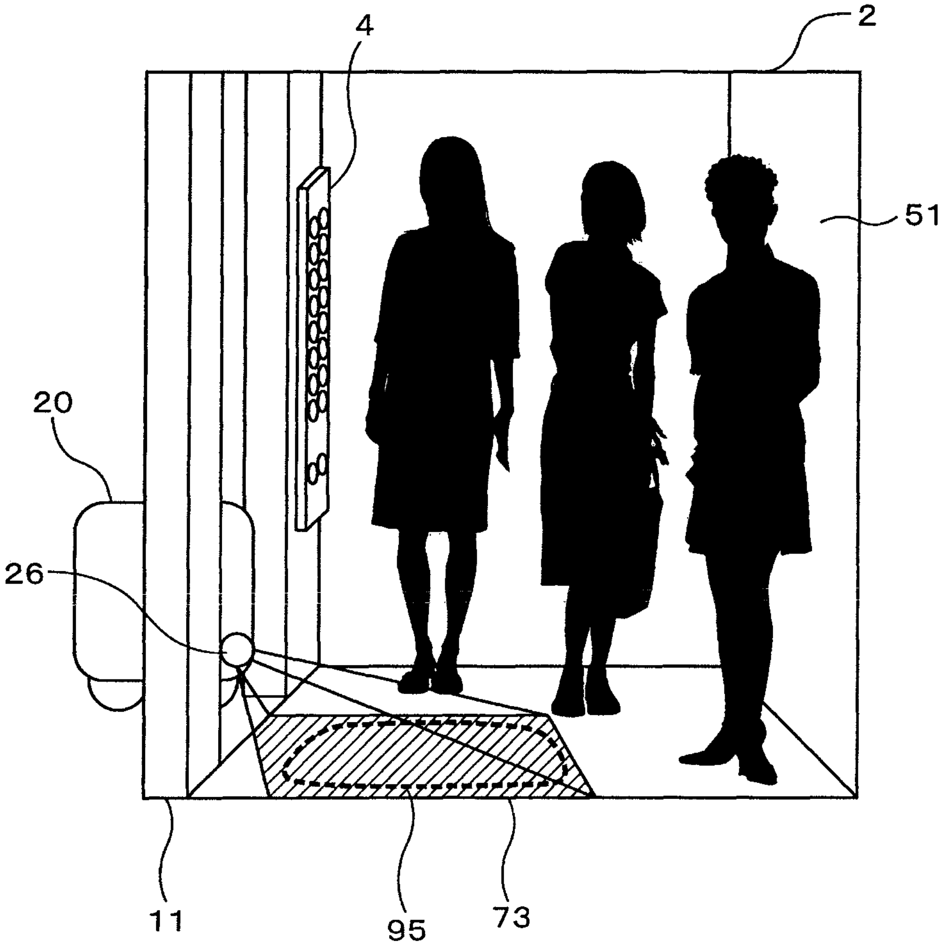
FIG. 5 illustrates another example of presentation of the riding area of the autonomous mobile robot according to the embodiment of the present invention.

FIG. 5 shows another particular method for the riding area presentation unit 26.

FIG. 5 illustrates another example of presentation of the riding area of the autonomous mobile robot according to the embodiment of the present invention.

In FIG. 5, it may be arranged such that the autonomous mobile robot 20 is provided with the riding area presentation unit 26 using an illumination tool. The riding area is visually presented to the people by irradiating the floor of the riding area with particular color light. This method is appropriate to a case where the riding area is changed at any time.

Further, it may be arranged such that voice guidance explaining the riding area is outputted from a speaker provided in the autonomous mobile robot 20 or the cage 2.

Further, the riding area presentation unit 26 may present an area to the cage 2 in the hall, in addition to the riding area in the cage 2. More particularly, a standby position for the autonomous mobile robot 20 to wait for the arrival of the cage 2 is relatively determined with respect to the hall door 12 of the elevator, and the area from the position to the hall door 12 is presented.

As the user can grasp the moving range of the autonomous mobile robot 20 by the representation of the riding area, he/she does not enter the riding area to avoid danger. Further, as described later, the autonomous mobile robot 20 does not get on the cage when the riding area is not available. Accordingly, a user who does not want to take the elevator together with the autonomous mobile robot 20 can get on the cage to intentionally enter the riding area, to prevent the autonomous mobile robot 20 from riding.

Numeral 27 shown in FIG. 1 denotes an available area detection unit to detect the size and position of an available area in the cage. Numeral 28 denotes a riding possibility/impossibility determination unit. The riding possibility/impossibility determination unit 28 determines whether or not the riding area 106 is continuously available for a predetermined period based on the result of detection by the available area detection unit 27. When the riding area 106 is continuously available for the predetermined period, the riding possibility/impossibility determination unit 28 determines that riding is possible, otherwise, determines that riding is impossible.

Only when the riding possibility/impossibility determination unit 28 determines that riding is possible, the autonomous mobile robot 20 gets on the cage 2. More particularly, the autonomous mobile robot 20 moves through the passage area to the riding position 107. To improve safety and human amenity, the riding possibility/impossibility determination unit 28 compares the area and shape of the cage 2 with the riding area. It may be arranged such that when predetermined human presence area width and human presence area cannot be ensured around the riding area, the riding possibility/impossibility determination unit 28 determines that riding is impossible. Further, it may be arranged such that when the area of the riding position 107 is a predetermined or higher percentage with respect to the area of the cage 2, the riding possibility/impossibility determination unit 28 determines that riding is impossible.

To improve the safety, the position and shape of the riding area for the autonomous mobile robot 20 is previously determined. When multiple autonomous mobile robots 20 in various sizes operate, the size and shape of the riding area may be set in correspondence with each autonomous mobile robot 20.

On the contrary, it may be arranged such that the position of the riding area is not previously determined but any position is set as long as necessary shape and area can be ensured. In such case, the riding possibility/impossibility determination unit 28 also determines the riding position 107. Then, the riding possibility/impossibility determination unit 28 supplies positional information on the riding position 107 to the autonomous movement controller 21, and the autonomous movement controller 21 controls the mobile unit 22 to arrive at the riding position 107.

Further, the riding possibility/impossibility determination unit 28 determines whether or not a passage having a predetermined width, from an arbitrary position around the riding position 107 to the entrance/exit can be ensured. When the riding possibility/impossibility determination unit 28 determines that the passage cannot be ensured, the autonomous mobile robot 20 once gets off the cage upon arrival at each floor, then available area detection is performed by the available area detection unit 27, and whether or not riding is possible is determined by the riding possibility/impossibility determination unit 28. When the riding possibility/impossibility determination unit 28 determines that riding is possible, the autonomous mobile robot 20 gets on the cage.

Further, in a case where a unit to instruct the autonomous mobile robot 20 to get off is provided in the display input unit 24 or the like, when the autonomous mobile robot 20 is instructed to get off using the unit, the autonomous movement controller 21 performs control to get off the autonomous mobile robot 20 upon stoppage of the cage 2. Then the available area detection is again performed by the available area detection unit 27, and whether or not riding is possible is determined by the riding possibility/impossibility determination unit 28. When the riding possibility/impossibility determination unit 28 determines that riding is possible, the autonomous mobile robot 20 gets on the cage. In this arrangement, it is possible for the user to explicitly instruct the autonomous mobile robot 20 to get off when, e.g., the user, disturbed by the autonomous mobile robot 20, cannot get off.

In case of emergency such as an earthquake, the elevator controller 1 instructs the autonomous movement controller 21 to get off at the floor stopped immediately after the incident. In such case, when it has been determined that a passage from an area around the riding position 107 to the entrance/exit cannot be ensured, the autonomous movement controller 21 controls the get-off operation immediately after the door is opened. Further, even when the autonomous mobile robot 20 carries a user, the autonomous movement controller 21 controls the get-off operation immediately after the door is opened.

The information necessary for determination such as information on the riding area for the autonomous mobile robot 20, specification information of the autonomous mobile robot 20 i.e. the width, shape of the autonomous mobile robot 20, information on the width, area, marginal width necessary upon moving, is previously given to the riding possibility/impossibility determination unit 28.

Further, it may be arranged such that weight information is added to the specification information, and when the weight of the autonomous mobile robot 20 takes a predetermined or higher percentage to the loadable weight of the cage 2, it is determined that riding is impossible. As the weight changes in accordance with goods loaded on the autonomous mobile robot 20, the total weight upon calling-out may be weight information. Otherwise, information of weight obtained by adding the maximum deadweight of the autonomous mobile robot 20 to the weight of the autonomous mobile robot 20 may be the weight information. When the autonomous mobile robot 20 tows goods, the weight information may be information on the riding area including the towed goods and the weight information.

In FIG. 1, the available area detection unit 27 and the riding possibility/impossibility determination unit 28 are provided in the autonomous mobile robot 20, however, these units may be provided in the elevator 40. When the available area detection unit 27 is provided in the elevator 40 while the riding possibility/impossibility determination unit 28 is provided in the autonomous mobile robot 20, the result of detection by the available area detection unit 27 is transmitted via the autonomous mobile robot communication unit 6 and the elevator communication unit 25 to the riding possibility/impossibility determination unit 28. When the available area detection unit 27 is provided in the autonomous mobile robot 20 while the riding possibility/impossibility determination unit 28 is provided in the elevator 40, the result of detection by the available area detection unit 27 is similarly transmitted by communication to the riding possibility/impossibility determination unit 28. When the riding possibility/impossibility determination unit 28 is provided in the elevator 40, the result of riding possibility/impossibility determination is similarly transmitted by communication to the autonomous movement controller 21.

Further, when the riding possibility/impossibility determination unit 28 is provided in the elevator 40, riding area information and specification information of each autonomous mobile robot 20 are previously supplied, together with autonomous mobile robot identification information, to the riding possibility/impossibility determination unit 28. When the autonomous mobile robot 20 performs the riding operation, the autonomous movement controller 21 transmits the autonomous mobile robot identification information to the elevator controller 1, and the riding possibility/impossibility determination is performed based on the information on the autonomous mobile robot 20. Otherwise, when the autonomous mobile robot 20 performs the riding operation, the autonomous movement controller 21 transmits the riding area information and the specification information to the elevator controller 1, and the riding possibility/impossibility determination is performed based on the information.

When the available area detection unit 27 and the riding possibility/impossibility determination unit 28 are provided in the elevator 40, the available area detection and the riding possibility/impossibility determination can be performed during the ascent/descent operation of the cage 2. When a calling-out request is made from the autonomous mobile robot 20 and calling-out for the current floor is not made with the hall operation panel 5 and further the floor is not designated as a destination floor, the available area detection unit 27 and the riding possibility/impossibility determination unit 28 perform the riding possibility/impossibility before arrival of the autonomous mobile robot 20 at the floor called from the autonomous mobile robot 20. It may be arranged such that when it is determined that riding is impossible, the elevator controller 1 controls the elevator not to stop at the calling-out floor from the autonomous mobile robot 20 but to move to the next destination floor. With this arrangement, when the possibility of the riding is low for the autonomous mobile robot 20, the operation of temporary stoppage of the cage 2 can be omitted, accordingly, the conveyance efficiency is improved.

An example of the method of detection by the available area detection unit 27 is described using FIG. 4. As the presented autonomous mobile robot riding area 71 is colored distinguishably from other areas, detection using an image is appropriate to this case. For example, the monitor camera 13 (shown in FIG. 2) attached around the ceiling of the cage is utilized. An image obtained by the monitor camera 13 is sent to the available area detection unit 27. The position and color of the presented autonomous mobile robot riding area 71 are previously inputted into the available area detection unit 27. The available area detection unit 27 determines whether or not the color of the presented autonomous mobile robot riding area 71 is the designated color. Thus the available area detection unit 27 can detect an available area.

Figure 6:
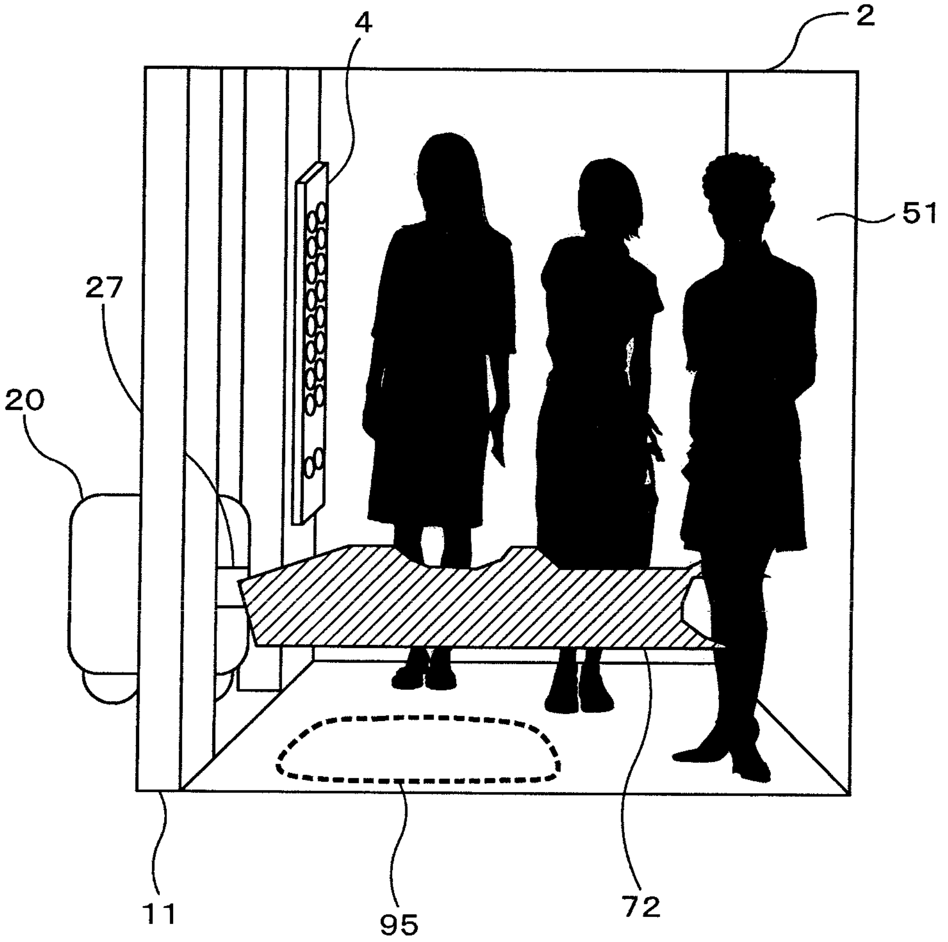
FIG. 6 illustrates an example of available area detection method according to the embodiment of the present invention.

FIG. 6 shows another example of the available area detection method.

FIG. 6 illustrates an example of the available area detection method according to the embodiment of the present invention.

In FIG. 6, the available area detection unit 27 provided in the autonomous mobile robot 20 is a laser-scanner type available area detection unit. The available area detection unit 27 scans a horizontal surface to measure a distance to a peripheral object. The range from a light emitting position of the available area detection unit 27 to the peripheral object is the available area. In FIG. 6, an area denoted by numeral 72 is a detected available area surface.

Figure 7:
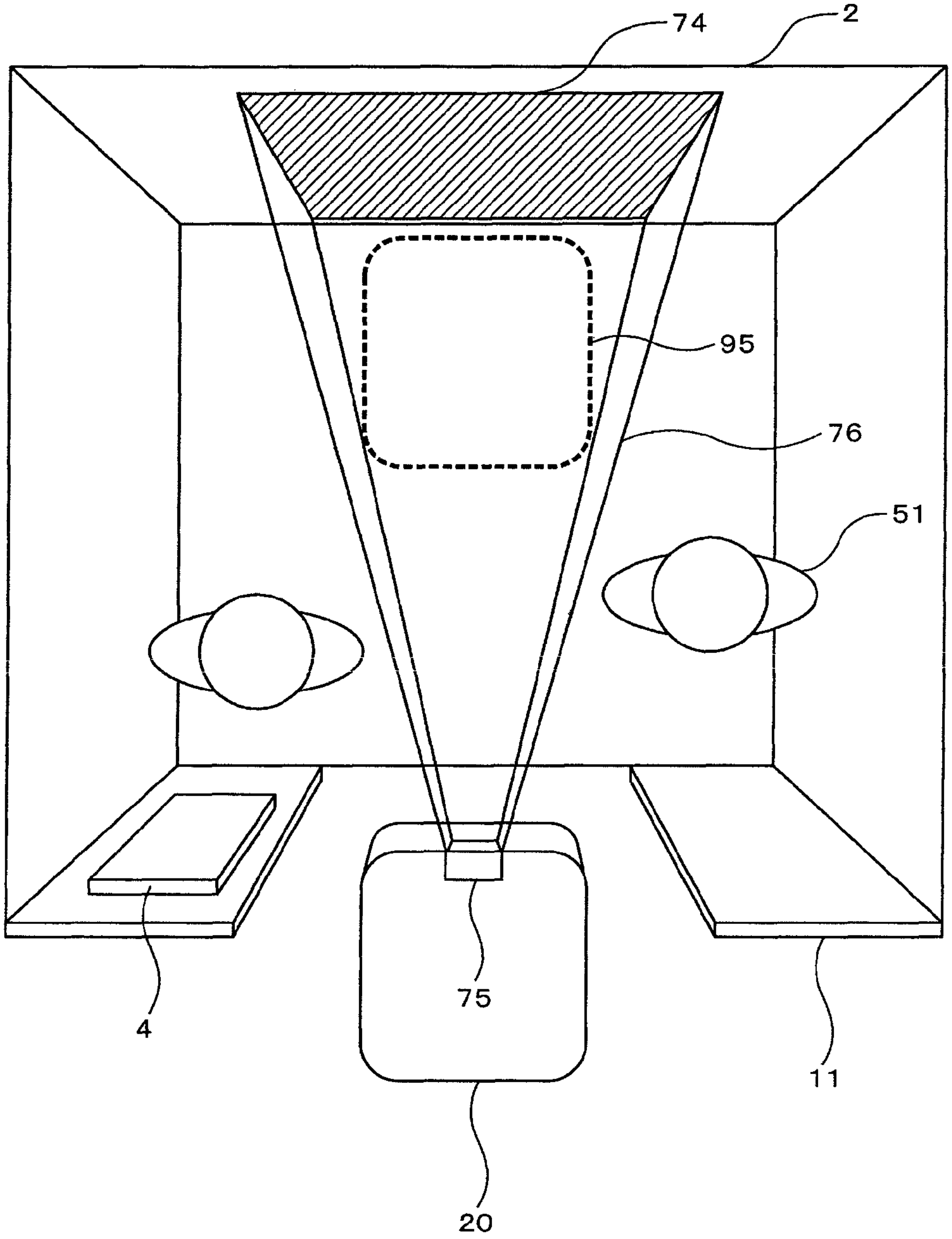
FIG. 7 illustrates another example of the available area detection method according to the embodiment of the present invention.

FIG. 7 shows another example of the available area detection method.

FIG. 7 illustrates another example of the available area detection method according to the embodiment of the present invention.

In FIG. 7, the color of a wall surface of the cage 2 is changed for available area detection in accordance with image. Assuming that the riding position is a back of the entrance, the color of an area of a wall in the rear of the riding position, projecting the shape of the autonomous mobile robot 20 when placed in the riding position 107, is changed from that of the wall surrounding the area. A camera-type available area detection unit 75 obtains an image, and an available area is detected. To avoid erroneous detection, the color for the detection is preferably a color generally not used in clothes of users. When a color in an invisible wavelength region is used, degradation of a fine show can be prevented.

Figure 8:
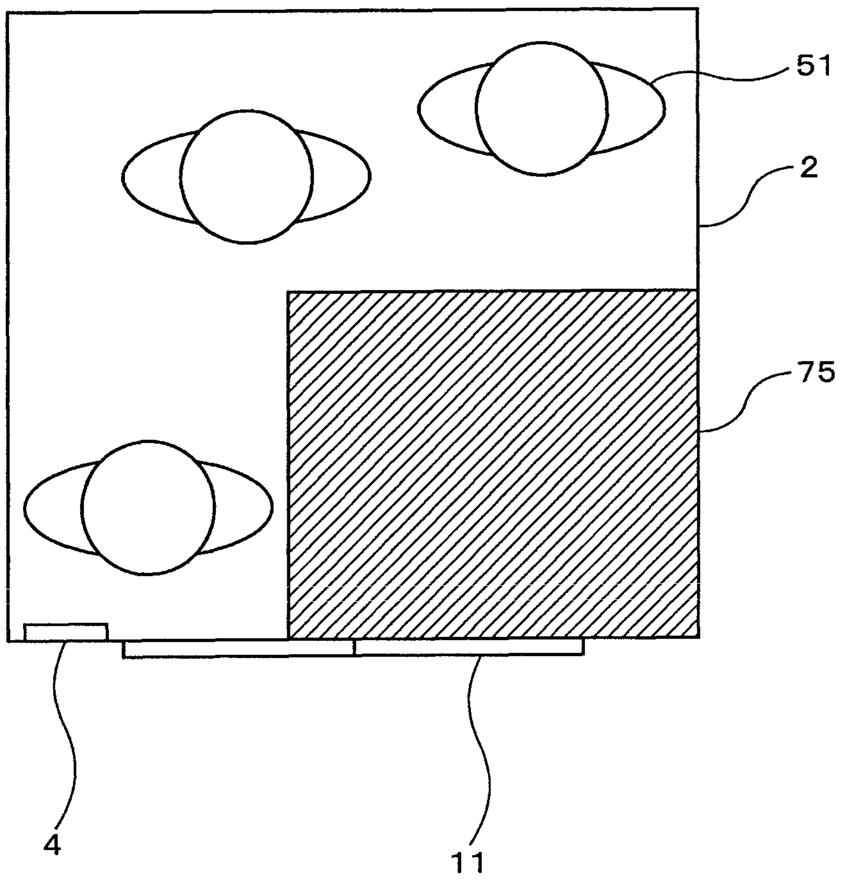
FIG. 8 illustrates another example of the available area detection method according to the embodiment of the present invention.

FIG. 8 shows another example of the available area detection method.

FIG. 8 illustrates another example of the available area detection method according to the embodiment of the present invention.

In FIG. 8, a mat-type switch is placed on the floor in the riding area. When pressure is applied to the mat, a signal "weighted" is outputted. When a "weighted" signal is not outputted, it is determined that the riding area is available. Further, it may be arranged such that in place of the mat-type switch set on the floor, a sheet-type switch is built in the floor.

As another method of detection by the available area detection unit 27, the weight sensor 14 shown in FIG. 2 may be employed. The weight detected with the weight sensor 14 is divided by a predetermined value as an assumed weight per one user, thus an approximate number of users in the cage is obtained. The obtained number of users is multiplied by a predetermined value as an assumed exclusive possession floor area per one user, and is subtracted from the floor area of the cage. The remaining area corresponds to the size of the available area.

In FIG. 1, numeral 29 is a getting on/off status detection unit to detect the detailed position of the autonomous mobile robot 20. The getting on/off status detection unit 29 detects the detailed position of the autonomous mobile robot 20 in the cage and around the elevator in the hall. In FIG. 1, the getting on/off status detection unit 29 is provided in the autonomous mobile robot 20, however, the getting on/off status detection unit 29 may be provided in the elevator 40.

The getting on/off status detection unit 29 puts e.g. a marker which can be detected from an upper position on the autonomous mobile robot 20, and detects the marker with a marker detection unit such as a camera attached around the ceiling of the cage 2, thus obtains a relative position of the marker to the cage. The getting on/off status detection unit 29 detects at least four statuses, whether or not the entire autonomous mobile robot 20 exists outside the cage 2, whether or not the entire autonomous mobile robot 20 exists inside the cage 2, whether or not the autonomous mobile robot 20 is passing through the entrance/exit, and whether or not the autonomous mobile robot 20 is in the riding position 107. The result of detection by the getting on/off status detection unit 29 is supplied to the elevator controller 1 at any time.

When the autonomous mobile robot 20 is passing through the entrance/exit, the elevator controller 1 performs control not to close the door. Further, the getting on/off status detection unit 29 always detects the position of the autonomous mobile robot 20 during the upward/downward movement of the cage 2. When the autonomous mobile robot 20 moves, the elevator controller 1 controls the cage 2 to stop at the closest floor in the current moving direction and opens the door.

When the position recognition accuracy of the self position recognition unit 23 is high, the self position recognition unit 23 may be used as the getting on/off status detection unit 29. When the autonomous mobile robot 20 is provided with the getting on/off status detection unit 29, the result of detection by the getting on/off status detection unit 29 is transmitted to the elevator controller 1 at any time. When the elevator 40 is provided with the getting on/off status detection unit 29, the result of detection by the getting on/off status detection unit 29 is transmitted to the autonomous movement controller 21 at any time.

Next, the flow of control in the elevator system according to the embodiment of the present invention will be described using FIGS. 9A to 9C.

Figure 9A:
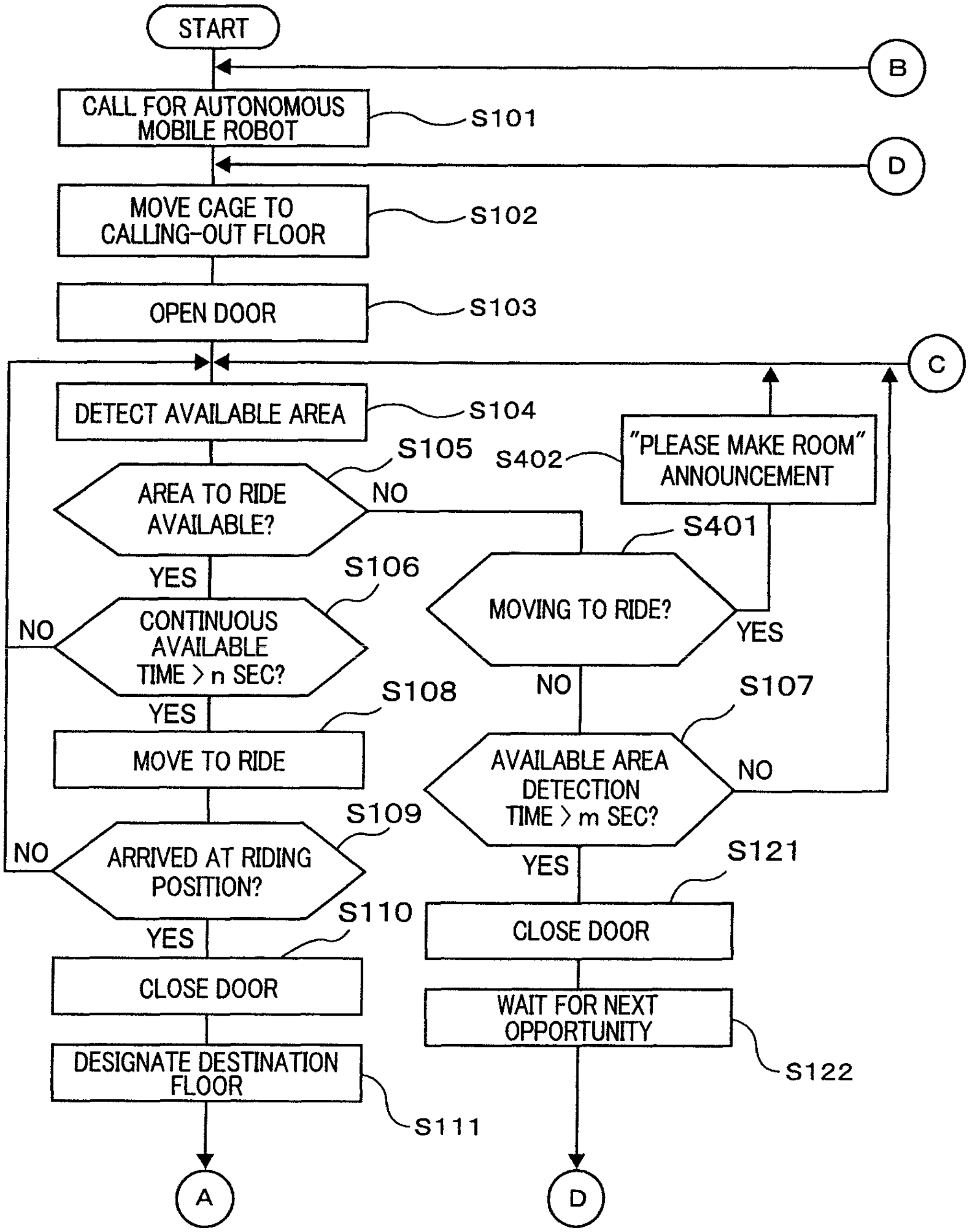
FIGS. 9A to 9C are flowcharts showing the flow of control in the elevator system according to the embodiment of the present invention.
Figure 9B:
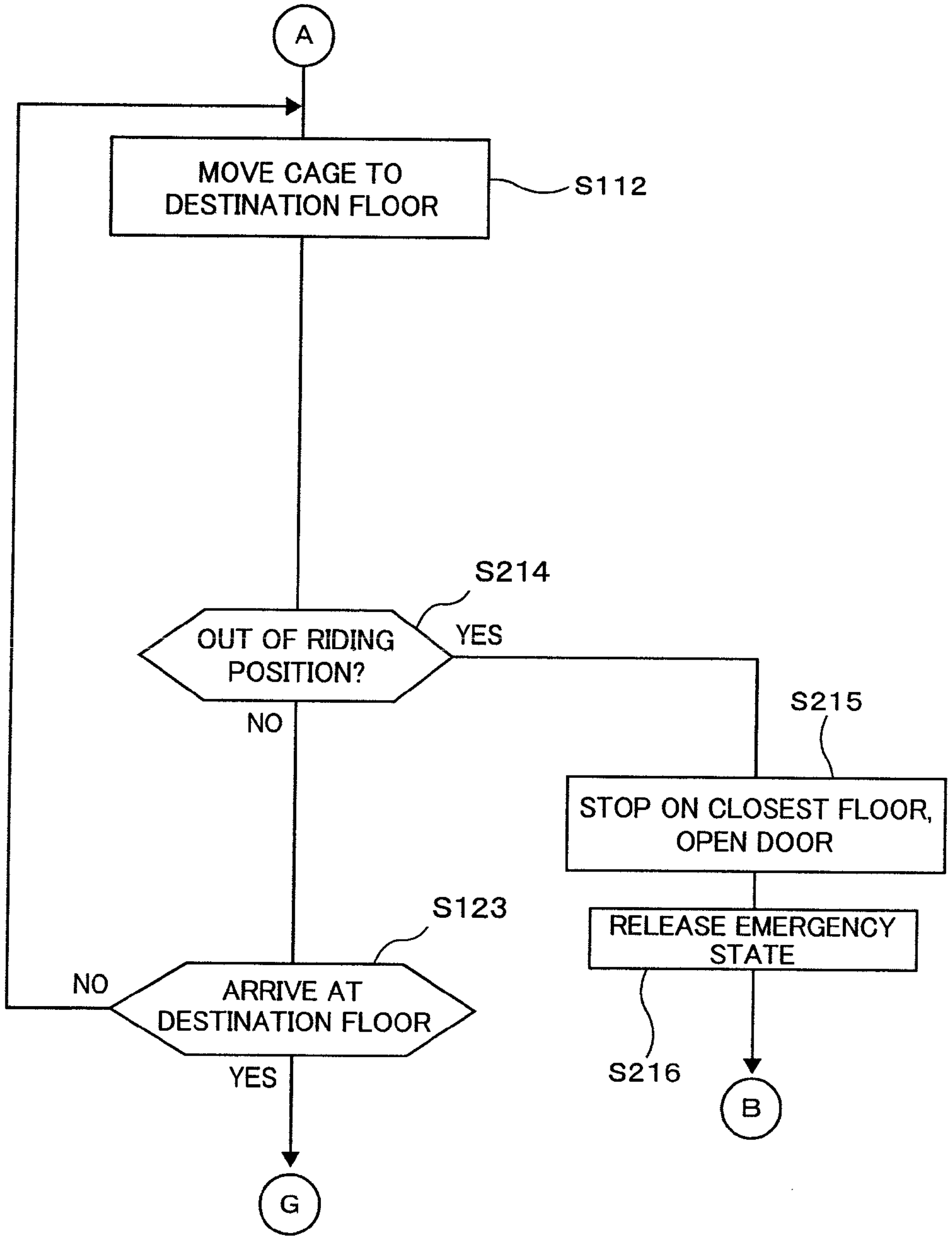
Figure 9C:
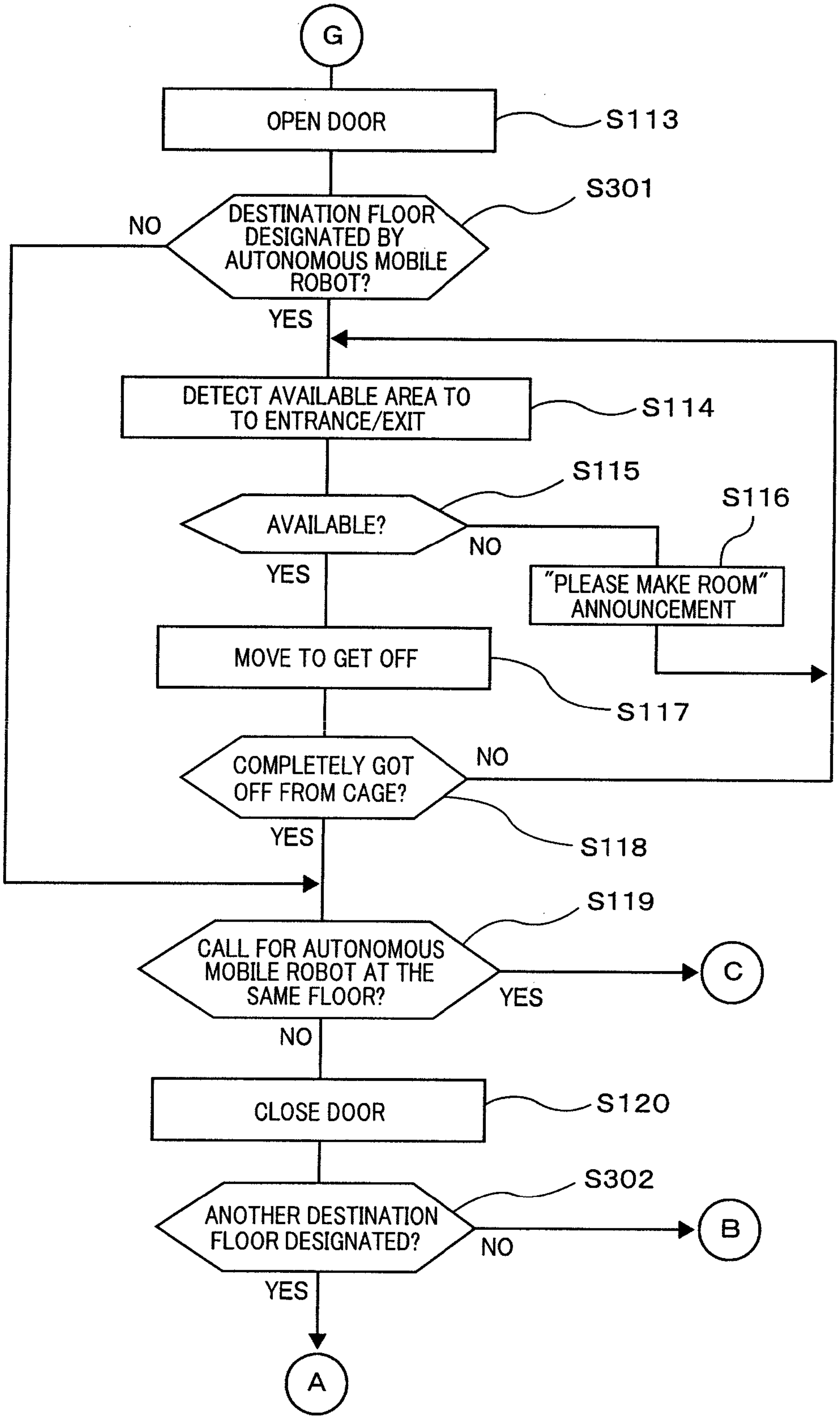

FIGS. 9A to 9C are flowcharts showing the flow of control in the elevator system according to the embodiment of the present invention.

In FIG. 9A, when a calling-out request is received from the autonomous mobile robot 20 (S101), the elevator controller 1 controls the cage ascent/descent unit 3 to move the cage 2 to the calling-out floor (S102). In the case of elevator system where multiple cages in different sizes exist, the elevator controller 1 performs control to send a cage in a size appropriate to the autonomous mobile robot 20 to the calling-out floor.

When the cage 2 arrives at the calling-out floor, the elevator controller 1 controls the door opening/closing unit 7 to open the door (S103). Then, the available area detection unit 27 starts the available area detection (S104). Then the riding possibility/impossibility determination unit 28 determines whether or not a riding area is available (S105). When the riding area is available, time n1, in which it is continuously determined that the riding area is available, is measured. As users get on and off and further change their positions, the available area may be changed. Then it is determined whether or not the time n1 is equal to or longer than predetermined period, n (S106). As the time n1, about 2 seconds is appropriate. When it is determined that the determination that the riding area is available is shorter than n seconds, the process returns to step S104, at which the available area detection is performed again. At step S106, when the time n1 is n seconds or longer, the process proceeds to the next step S108.

When it is determined at step S105 that the riding area is not available and the time from the start of the available area detection is equal to or longer than predetermined m seconds (S107), the ride-moving of the autonomous mobile robot 20 is stopped, then the elevator controller 1 closes the door (S121) and waits for the next riding opportunity. That is, after the conveyance to all the currently-accepted calling-out floors and destination designated floors, or re-conveyance in the same direction, the arrival of the next cage is waited (S102). Then, when the door is opened (S103), the available area detection is started again (S104). Note that m is appropriately about ten seconds.

At step S106, when the continuous available time is longer than n seconds, the ride-moving is started (S108). The moving is continued until the arrival at the riding position 107 is checked by the getting on/off status detection unit 29 (S109). When it is determined that the riding area is not available during the movement of the autonomous mobile robot (S401), voice announcement "Please make room" is issued (S402). The announcement is performed by the elevator controller 1 (not shown) using a voice output unit provided in the hall, the cage 2, and the autonomous mobile robot 20. Otherwise, the autonomous movement controller 21 (not shown)

performs the announcement using a voice output unit provided in the autonomous mobile robot 20. Note that during the ride-moving, the determination of available area is not performed with respect to a passage area other than the travelling direction.

Thereafter, the door is closed (S110), then the user 51 and the autonomous mobile robot 20 designate destination floors (S111). The elevator controller 1 moves the cage 2 sequentially to the designated floors.

In FIG. 9B, during the movement (S112), the getting on/off status detection unit 29 always detects the position of the autonomous mobile robot 20 to determine whether or not the position of the autonomous mobile robot 20 has moved (S214). When it is determined that the autonomous mobile robot 20 has moved, the elevator controller 1 performs control to stop the cage 2 at the closest floor in the current moving direction and opens the door after stoppage (S215). When it is determined by remote diagnosis from an elevator monitor center (not shown) or manual checking that the autonomous mobile robot 20 is in a normal status, and a predetermined emergency release procedure has been performed (S216), the process returns to step S101.

In FIG. 9C, when the position of the autonomous mobile robot 20 has not moved and arrived at the destination floor (S123), the door opening/closing unit 7 opens the door (S113). The determination as to whether or not the autonomous mobile robot 20 has arrived at the destination floor is performed by the elevator controller 1 by comparison between destination designation information from each autonomous mobile robot 20 and a current cage position. When it is determined that the autonomous mobile robot 20 has arrived at the destination floor, the arrival may be transmitted by communication to the autonomous mobile robot 20, otherwise, the autonomous mobile robot 20 autonomously determines the arrival by recognizing the floor display in the cage (S301).

When the autonomous mobile robot 20 gets off the cage, the available area detection unit 27 detects an available area from the autonomous mobile robot 20 to the entrance/exit (S114). When the space is not sufficient (S115), announcement "please make room to exit" is made (S116). When the space is sufficient, the autonomous mobile robot 20 moves toward the entrance/exit (S117). The operation is repeated until the getting on/off status detection unit 29 detects that the autonomous mobile robot 20 has completely got off the cage 2 (S118).

When the autonomous mobile robot 20 has got off the cage 2, the elevator controller 1 checks whether or not there is another calling out for the autonomous mobile robot 20 on the same floor (S119), and when there is another calling out, the operation from step S104 is repeated. When there is no other calling out, the elevator controller 1 closes the door (S120). When another destination floor is designated, the operation from step S112 is repeated, otherwise, the process returns to step S101 (S302).

Next, an example of operation of the elevator system according to the embodiment of the present invention will be described using FIG. 10.

Figure 10:
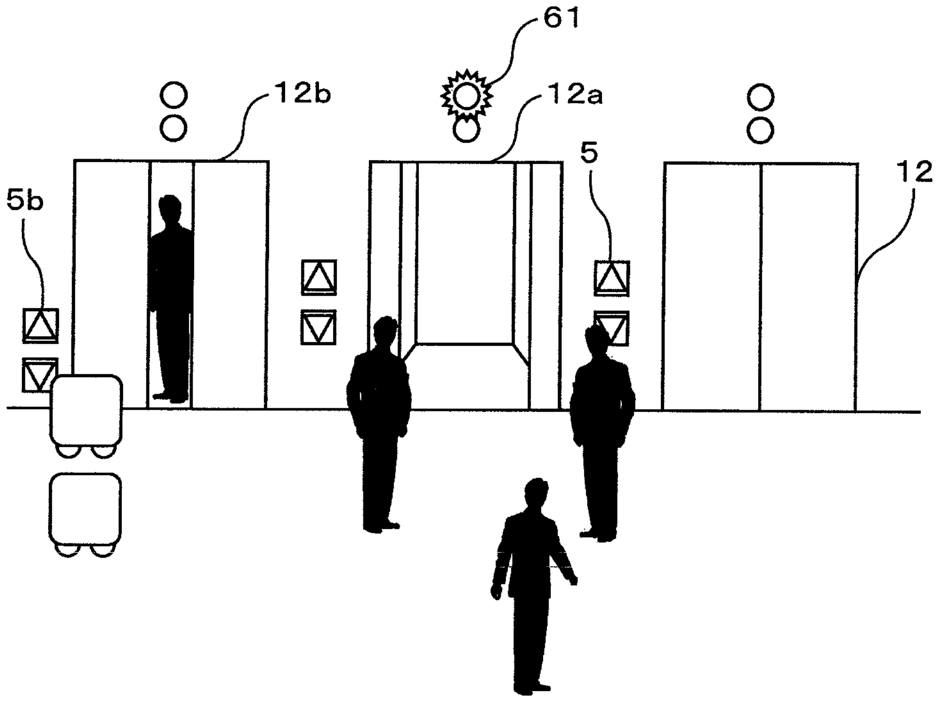
FIG. 10 illustrates an example of operation of the elevator system according to the embodiment of the present invention.

FIG. 10 illustrates an example of the operation of the elevator system according to the embodiment of the present invention.

FIG. 10 shows a control method for, under a particular condition for the sake of further improvement in safety, ride-moving of the autonomous mobile robot 20 and a user 51 in different cages.

In the case of an elevator system where multiple elevators are provided in the elevator hall, in some cases, multiple cages almost simultaneously arrive at the same floor in accordance with destination floor designated by the users in the cages. Otherwise, when a calling-out request from the autonomous mobile robot 20 and a calling-out request from the hall operation panel 5 occur on the same floor, the elevator controller 1 controls the ascent/descent speed and timing to move the multiple cages to the floor almost simultaneously. At this time, the autonomous mobile robot 20 gets on a cage which arrived behind.

More particularly, the elevator controller 1 always monitors a calling-out request from the autonomous mobile robot 20 and the hall operation panel 5 and the current position of the cage 2. When it is determined that multiple cages 2 are to almost simultaneously arrive at a floor where calling-out requests from the autonomous mobile robot 20 and the hall operation panel 5 have simultaneously occurred, the elevator controller 1 transmits riding permission information via the autonomous mobile robot communication unit 6 to the autonomous mobile robot 20 that issued the calling-out request on the floor to get on an elevator which is to arrive behind. That is, the elevator controller 1 transmits riding permission information together with identification information of the riding-permitted elevator. The autonomous mobile robot 20 reads elevator position information corresponding to the identification information of the elevator from a previously-stored database, and moves to a position in front of the riding-permitted elevator.

On the other hand, the elevator controller 1 turns on only the cage arrival advance lamp 61 of an elevator which is to arrive ahead. Since a user tends to move to wait in a position in front of an elevator with its cage arrival advance lamp 61 turned on, the user gets on the cage arrived ahead, while the autonomous mobile robot 20 gets on the cage arrived behind. In this manner, it can be expected that the user and the autonomous mobile robot 20 comparatively separately get on the cages. As a result, contact between the autonomous mobile robot 20 and human user can be prevented. Further, when only human users get on the cage, more users can get on the cage more tightly, accordingly, more efficient conveyance can be expected.

Next, the configuration of the elevator system according to another embodiment of the present invention will be described using FIGS. 11 and 12.

Figure 11:
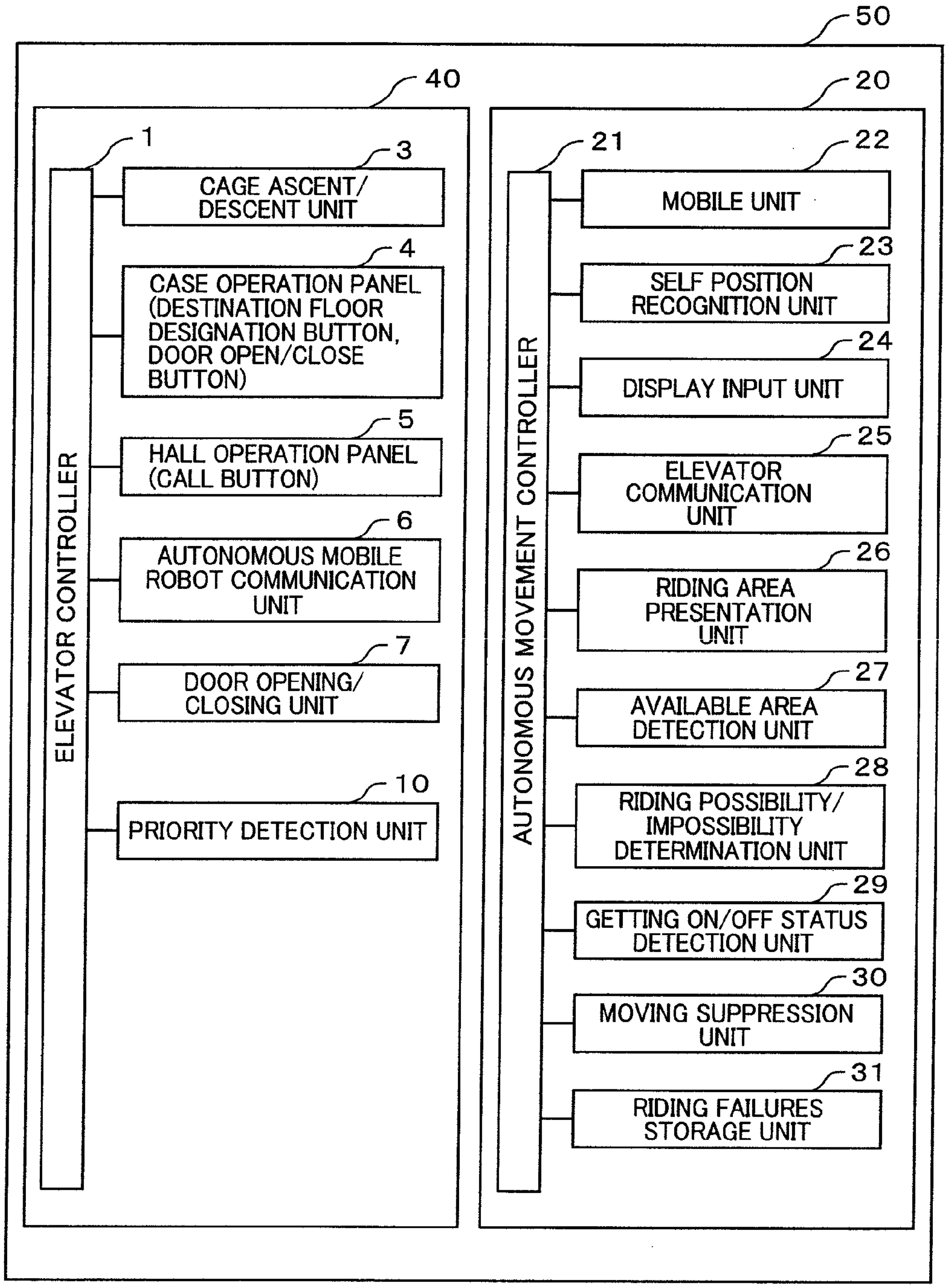
FIG. 11 is a block diagram showing the configuration of the elevator system according to another embodiment of the present invention.
Figure 12:
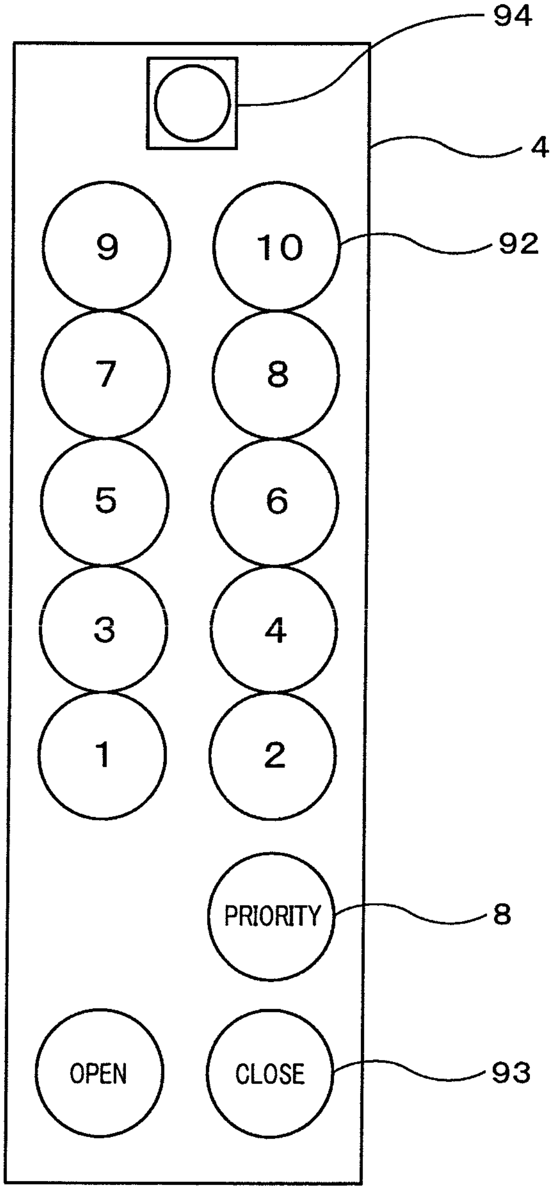
FIG. 12 illustrates an example of a priority detection unit according to the other embodiment of the present invention.

FIG. 11 is a block diagram showing the configuration of the elevator system according to the other embodiment of the present invention. FIG. 12 illustrates an example of a priority detection unit according to the other embodiment of the present invention.

The elevator 40 shown in FIG. 11 has a priority detection unit 10 in addition to the units of the elevator 40 of the elevator system shown in FIG. 1.

In FIG. 11, when a calling-out request is issued or destination floor designation is made using the hall operation panel 5 and the cage operation panel 4, the priority detection unit 10 detects priorities of the conveyance requests. For example, the cage operation panel 4 has button type switches 92 for destination floor designation and button type switches 93 for door closing/opening designation as shown in FIG. 12. In addition, the cage operation panel 4 has a button type switch 8 for designation of high-priority conveyance as the priority detection unit 10.

A user in emergency depresses the switch 92 indicating a destination floor, and also depresses the priority button 8 to designate a high priority request with respect to the elevator controller 1. When the high priority is designated, the elevator controller 1 controls the arrival at the floor designated by the user with higher priority than a calling-out request from the autonomous mobile robot 20 and destination floor designation.

For example, in a case where the autonomous mobile robot 20 exists in the cage 2 when the priority button 8 is depressed, the cage 2 is not stopped at the destination floor designated only by the autonomous mobile robot 20 until the movement in the current ascent/descent direction is completed and the cage starts to move in reverse, but is stopped at only the destination floor designated with the cage operation panel 4. Further, since the priority button 8 was depressed and before the movement in the current ascent/descent direction is completed and the cage starts to move in reverse, a calling-out request from the autonomous mobile robot 20 is not responded. Then, upon reverse movement, the priority control is released, and the cage is stopped at the destination floor designated by the autonomous mobile robot 20.

In a case where a calling-out request with the hall operation panel 5 is also not responded, the time for prior conveyance is further shortened. Further, to prevent designation of the calling-out floor for the autonomous mobile robot 20 as a destination floor with the cage operation panel 4 and getting-on of the autonomous mobile robot 20 upon stoppage at the calling-out floor for the autonomous mobile robot 20, the elevator controller 1 transmits riding prohibition information to the autonomous mobile robot 20. Then, when the cage starts to move in reverse and the priority control is released, the cage is stopped at the previous calling-out floor.

In a case where the priority button 8 is provided on the hall operation panel 5, when the priority button 8 is depressed together with the call button for ascent/descent direction designation, the following priority control is performed.

Even when a calling-out request is issued from the autonomous mobile robot 20 on another floor, the elevator controller 1 does not respond to the request, and moves the cage to the floor where the priority button 8 has been depressed. Then, the elevator controller 1 opens the door and closes the door at the floor, then, moves the cage to the ascent/descent direction designated with the hall operation panel 5, while does not respond to a calling-out request from the autonomous mobile robot 20 before the priority control is released. Further, even when the cage is stopped at the floor where the autonomous mobile robot 20 that issued the calling-out request exists, the elevator controller 1 transmits riding prohibition information to the autonomous mobile robot 20 not to get on the cage. When the autonomous mobile robot 20 exists upon depression of the priority button 8, the cage is not stopped at the destination floor designated by the autonomous mobile robot 20, but is moved to the calling-out floor where the priority button 8 is depressed. Then, the elevator controller 1 issues a command to the autonomous mobile robot 20 to get off from the cage 2 at the floor.

When the cage starts to move in reverse and the priority control is released, the cage is stopped at the previous calling-out floor.

When the priority button 8 is depressed many times, the conveyance efficiency of the autonomous mobile robot 20 is lowered. Accordingly, a camera 94 is provided to prevent overuse of the priority button 8, and when the priority button 8 is depressed, image sensing is performed on the user who depressed the button 8 with the camera 94, and an image is transmitted to an elevator system management center (not shown). With this arrangement, it is possible to ask the user who frequently uses the priority button 8 regarding the necessity of use and to warn the user not to overuse the priority button 8.

Next, another implementation of the priority detection unit 10 will be described.

As the priority detection unit 10, a unit to detect continuous depression of the ascent/descent direction button type switch in the hall operation panel 5 and count the number of depression times is provided. That is, the priority detection unit 10 counts the number of times of on/off of the switch within a predetermined period. Similarly, the priority detection unit 10 to count the number of continuous depression times is provided in the destination floor designation button type switch of the cage operation panel 4. When the call button or the destination floor designation button is depressed, the elevator controller 1 recognizes the number of continuous depression times as the priority of the content of the depressed button.

On the other hand, when the autonomous mobile robot 20 issues a calling-out request and performs destination floor designation via the communication unit 6, the priority information of the request is added. In this method, human user and the autonomous mobile robot 20 can designate two or more levels of priority. Further, it is possible to individually designate a prior destination floor. When a calling-out request is issued or destination floor designation is performed from the cage operation panel 4, the hall operation panel 5 or the autonomous mobile robot 20, the priority of the request or designation is compared with the priority of already-requested and uncompleted cage conveyance task. When it is determined as a result of comparison that the new request has higher priority, the movement of the cage in response to the previous calling-out request or the destination floor designation is suspended until the conveyance task in response to the new request is completed.

In FIG. 11, the autonomous mobile robot 20 shown in FIG. 1 is provided with a moving suppression unit 30 and a riding failures storage unit 31. The moving suppression unit 30 suppresses movement of the autonomous mobile robot 20 by a method different from that of the drive control unit of the autonomous mobile robot 20 in normal moving times.

Figure 13:
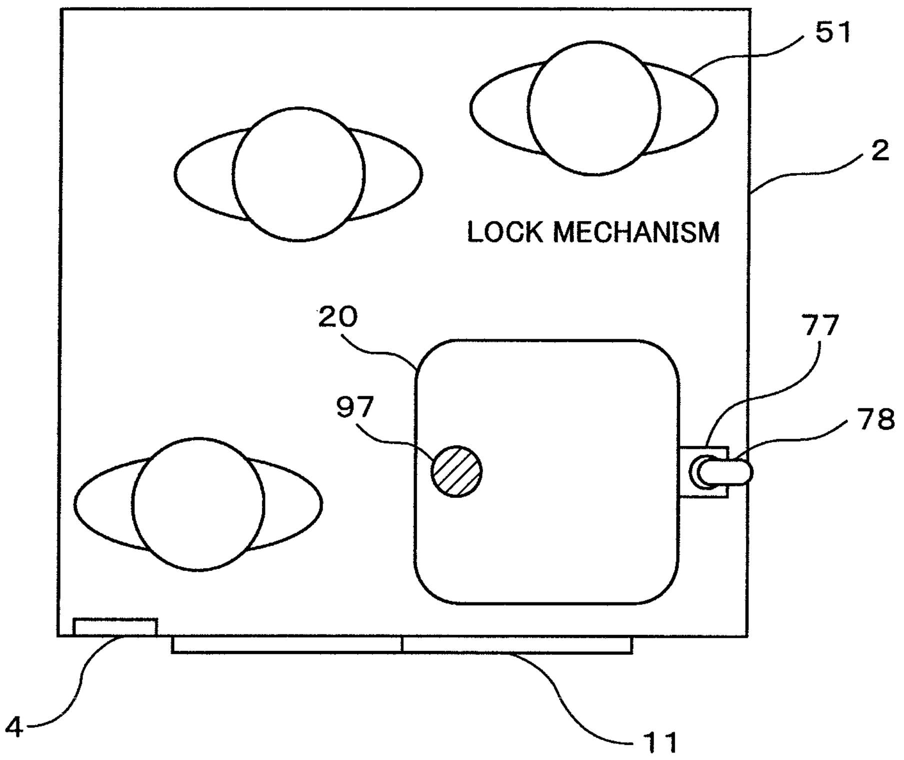
FIG. 13 illustrates an example of a moving suppression unit according to the other embodiment of the present invention.
Figure 14:
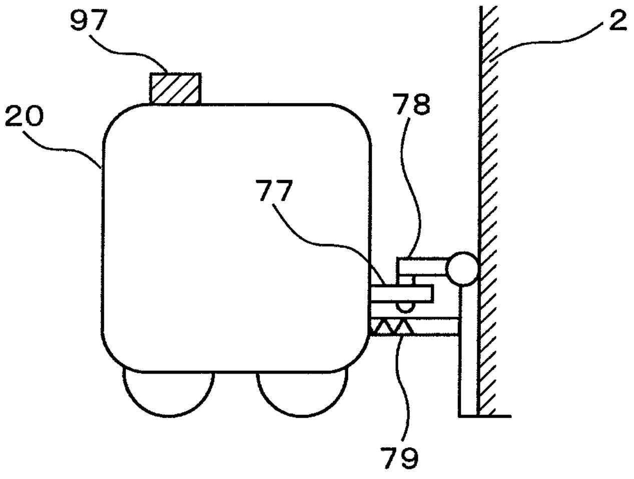
FIG. 14 illustrates another example of the moving suppression unit according to the other embodiment of the present invention.

FIGS. 13 and 14 show a particular example of implementation of the moving suppression unit.

FIG. 13 illustrates an example of the moving suppression unit according to the other embodiment of the present invention. FIG. 14 is a side view showing another example of the moving suppression unit according to the other embodiment of the present invention.

In FIGS. 13 and 14, numeral 77 denotes a fixing bracket attached to the autonomous mobile robot 20. Numeral 78 denotes a fixing unit fixed to the cage 2. As shown in FIG. 14, the fixing unit 78 is rotated about a rotation axis and is inserted through a hole in the fixing bracket 77 and thus fixed. The rotation of the fixing unit 78 is performed with a motor (not shown), and the elevator controller 1 controls fixing and release. As the controller other than the autonomous mobile robot 20 performs fixing and release, even upon overdrive of the autonomous mobile robot 20, the movement of the autonomous mobile robot 20 can be suppressed.

In the example shown in FIG. 13, a charging unit 79 is provided for improvement in convenience. Charging is performed by utilizing the time in which the autonomous mobile robot 20 is fixed in the cage. The charging unit 70 may be a capacitor type charging device capable of charging in extremely short period.

Numeral 97 denotes an emergency stop unit of the autonomous mobile robot 20. The direction of the emergency stop unit 97 in the riding position 170 is determined so as to assist a human user who takes the elevator together with the autonomous mobile robot 20 to depress the emergency stop unit 97.

In FIG. 13, as the riding position 107 is by the wall with the fixing unit 78, the autonomous mobile robot 20 is designed and the direction of the autonomous mobile robot 20 in the riding position 107 is determined such that the emergency stop unit 97 is on the opposite side to the wall while the fixing bracket 77 is on the wall side.

Figure 15:
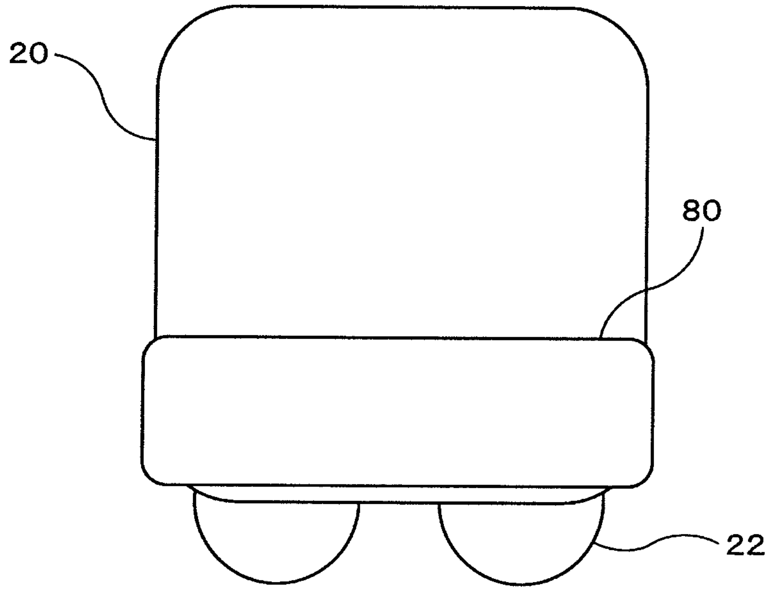
FIG. 15 illustrates another example of the moving suppression unit according to the other embodiment of the present invention.
Figure 16:
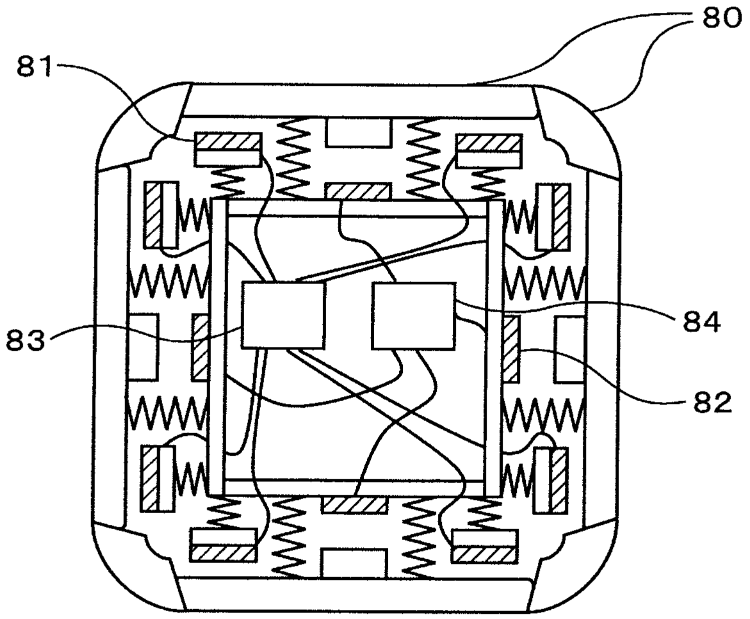
FIG. 16 illustrates another example of the moving suppression unit according to the other embodiment of the present invention.

FIGS. 15 and 16 show another example of implementation of the moving suppression unit 30.

FIG. 15 illustrates another example of the moving suppression unit according to the other embodiment of the present invention. FIG. 16 illustrates another example of the moving suppression unit according to the other embodiment of the present invention.

In FIGS. 15 and 16, numeral 80 denotes a bumper provided on the periphery of the case of the autonomous mobile robot 20. The bumper 80 has a two-stage bumper sensor to, when the bumper 80 is pushed with a weak force, suppress movement of the autonomous mobile robot 20 with software, while when the bumper 80 is pushed with a strong force, mechanically suppress the movement of the autonomous mobile robot 20. The outline will be described using FIG. 16.

The bumper 80 is connected to the case with a spring. When a force is applied to the bumper 80, the bumper 80 enters inside into contact with a weak-force switch 81, then the weak-fore switch 81 becomes on, and a signal is sent to a software controller 83. The software controller 83 sets a command value of driving control to the motor to a speed 0.

When a stronger force is applied, the bumper 80 enters further inside to push a strong-force switch 82, to disconnect a circuit of a power source supply unit to a brake release unit 84. When the circuit is disconnected, the brake is turned on, and movement of the autonomous mobile robot 20 is suppressed.

Figure 17:
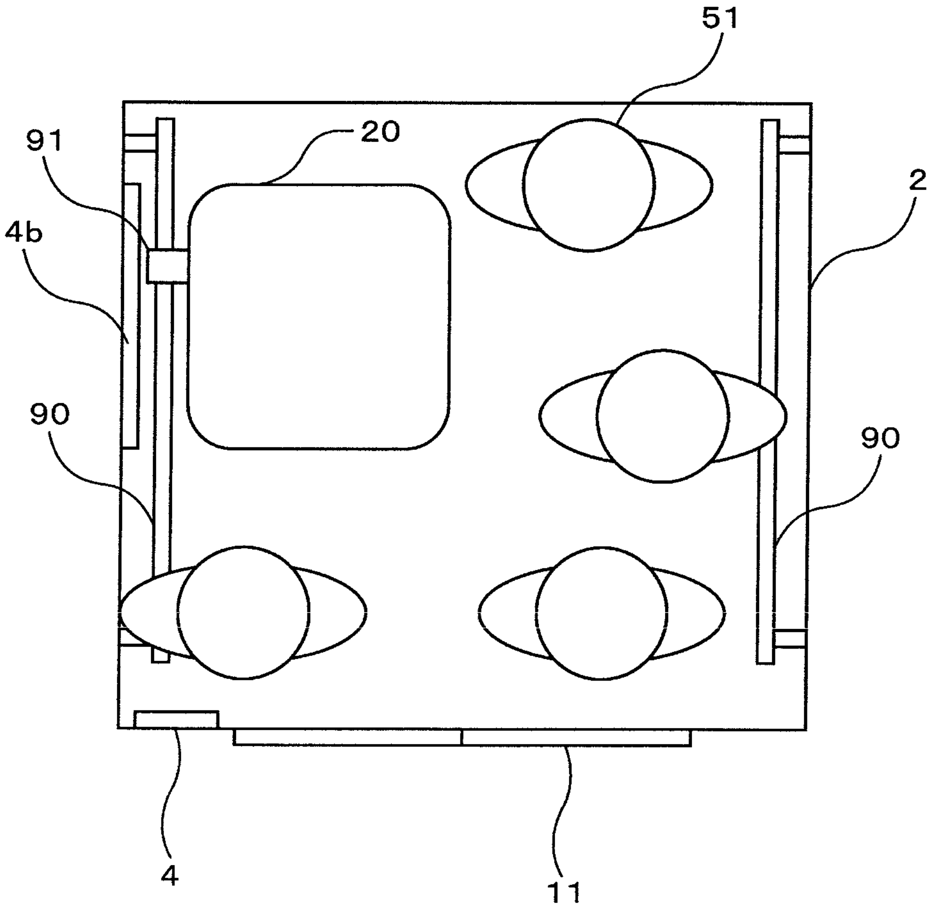
FIG. 17 illustrates another example of the moving suppression unit according to the other embodiment of the present invention.

FIG. 17 shows another example of implementation of the moving suppression unit 30.

FIG. 17 illustrates another example of the moving suppression unit according to the other embodiment of the present invention.

In FIG. 17, a fixing unit 91 of the autonomous mobile robot 20 is hooked on a hand rail 90 in the cage 2. The autonomous mobile robot 20 controls motive power for hooking. Since a person in wheel chairs also uses the hand rail, when a calling-out request is issued with the wheel chair hall operation panel 5*b* and the autonomous mobile robot 20 exists in the cage 2, the autonomous mobile robot 20 gets off from the cage 2. Then, the elevator controller 1 performs control to suspend a calling-out request from the autonomous mobile robot 20 and ride-moving of the autonomous mobile robot 20 since the calling-out request was issued from the wheel chair hall operation panel 5*b* until the cage 2 starts to move in reverse.

Figure 18:
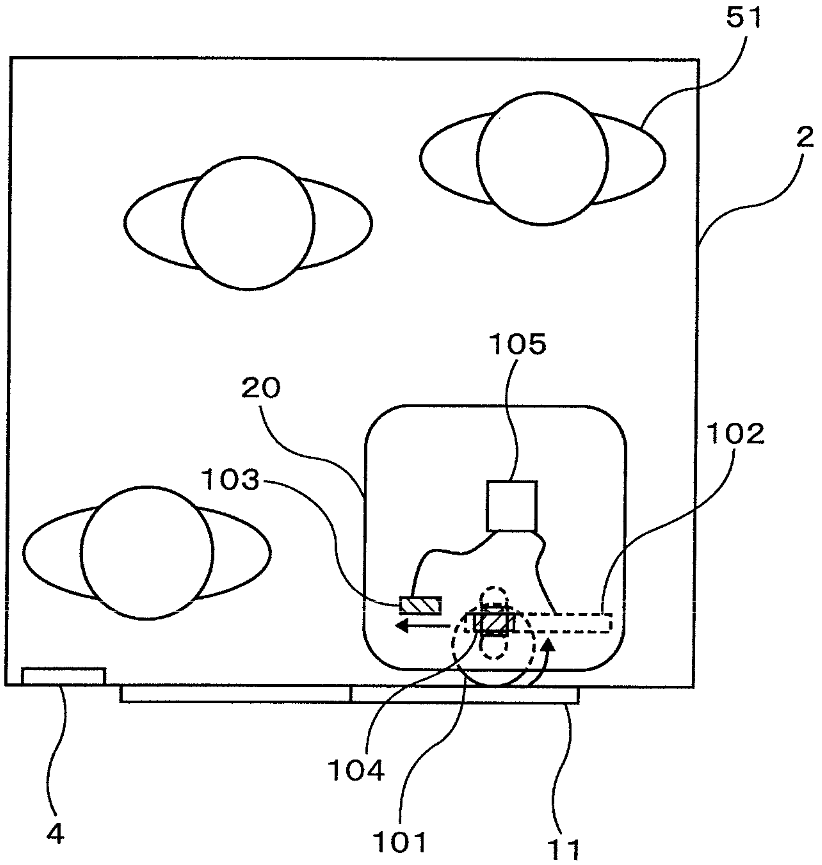
FIG. 18 illustrates another example of the moving suppression unit according to the other embodiment of the present invention.

FIG. 18 shows an example of the moving suppression unit to start and release movement suppression by utilizing door opening/closing operation.

FIG. 18 illustrates another example of the moving suppression unit according to the other embodiment of the present invention.

In FIG. 18, numeral 101 denotes a door driven roller. When the autonomous mobile robot 20 gets on the cage 2, it brings the door driven roller 101 into slight contact with the cage door 11 and stops. The riding position 107 is set in a position where the door driven roller 101 is in contact with the cage door 11. When the cage door 11 is closed, the door driven roller 101 is rotated to move a contact bar 102, and when the contact bar 102 is away from a fixed contact 103, the power source supply circuit to the brake release unit 105 is disconnected and the brake becomes on. When the cage door 11 is opened, the door driven roller 101 is rotated in a reverse direction, to move the contact bar 102 in the opposite direction. When the contact bar 102 comes into contact with the fixed contact 103, the power source supply circuit to the brake release unit 105 is connected, the brake is released.

A reflector plate to reflect light from an upper part of the cage 2 is attached to a part of the contact bar 102. When the contact bar 102 is away from the fixed contact 103, it is viewed from a reflector plate window 104 provided in the upper part of the autonomous mobile robot 20. The reflector plate is attached to a position from which the reflector plate is not viewed from the reflector plate window 104 provided in the upper part of the autonomous mobile robot 20 when the contact bar 102 is in contact with the fixed contact 103. A camera is provided in the upper part of the cage 2, and by detecting presence/absence of the reflecting plate with the camera, the brake on/off status of the autonomous mobile robot 20 can be monitored. As the elevator controller 1 performs control to move up/down the cage 2 only when the brake is on, the safety is assured. Further, in this method, it is not necessary to newly attach any special mechanism to the cage 2.

Figure 19:
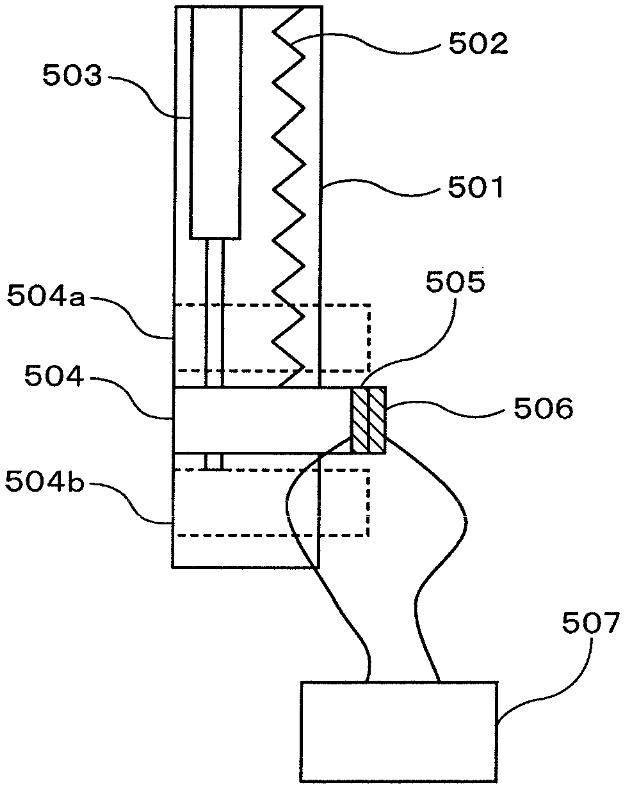
FIG. 19 illustrates another example of the moving suppression unit according to the other embodiment of the present invention.

FIG. 19 shows another example of implementation of the moving suppression unit 30.

FIG. 19 illustrates another example of the moving suppression unit according to the other embodiment of the present invention.

In the example of FIG. 19, acceleration/deceleration of the elevator is utilized. Numeral 501 denotes a low-pas actuator which operates only when a low-frequency force is applied, and 504, a weight. The weight 504 is connected to a spring 502 and a dumper 503. The weight 504 is moved in upward/downward direction as indicated with a dotted line in the figure only when a low-frequency force is applied to the weight 504. When the cage 2 is moved up, the material in the cage 2 receives an acceleration/deceleration force, and may receive a high-frequency strong force in accordance with installation precision of the elevator. The specifications of the spring 502 and the damper 503 are determined such that weight 504 is not moved with the latter high frequency force but is moved only with the former acceleration/deceleration force. A contact 505 is attached to the weight 504. When no force is applied to the weight, the contact 505 is in contact with a fixed contact 506.

When an acceleration/deceleration force is applied in an upward direction in the figure, the weight is in a position denoted by numeral 504*a* (indicated with a dotted line), and the contact 505 is away from the fixed contact 506. The low-pass actuator 501 is attached to the autonomous mobile robot 20 such that the upward/downward direction in the figure corresponds with the ascent/descent direction of the cage 2.

The contact 505 and the fixed contact 506 are connected to a control circuit 507. When the contact point in the control circuit 507 is once changed from on to off, the power source supply to the brake release unit of the autonomous mobile robot 20 is disconnected, and when the contact point is again changed from off to on, the power source supply to the brake release unit of the autonomous mobile robot 20 is resumed, as a latch structure. Accordingly, the brake is applied with the acceleration force to move the cage 2 up, and the brake is released with the deceleration force upon completion of the upward movement. In this method, it is not necessary to newly attach any special mechanism to the cage 2.

In the autonomous mobile robot 20 when the cage 2 is being moved up, the driving power source of the mobile unit may be off. Further, in the case of the mobile unit, in contact with the floor, to be moved with a reaction force from the floor, it may be arranged such that a mechanism to prevent the mobile unit from being grounded to the floor is provided. During upward movement of the cage 2, the mobile unit is prevented from being grounded to the floor.

The riding failures storage unit 31 in FIG. 11 stores the number of times of cancelled riding due to failure of detection of riding possibility within a predetermined period. The elevator controller 1 and the autonomous movement controller 21 select a control method to increase the riding possibility for the autonomous mobile robot 20 in correspondence with the number of riding failures stored in the riding failures storage unit 31. For example, announcement to make a riding area is outputted, or time to determination of riding cancellation is prolonged.

Next, the flow of control in the elevator system shown in FIG. 11 will be described using FIGS. 20A to 20D.

FIGS. 20A to 20D are flowcharts showing the flow of control in the elevator system control according to the other embodiment of the present invention.

Figure 20A:
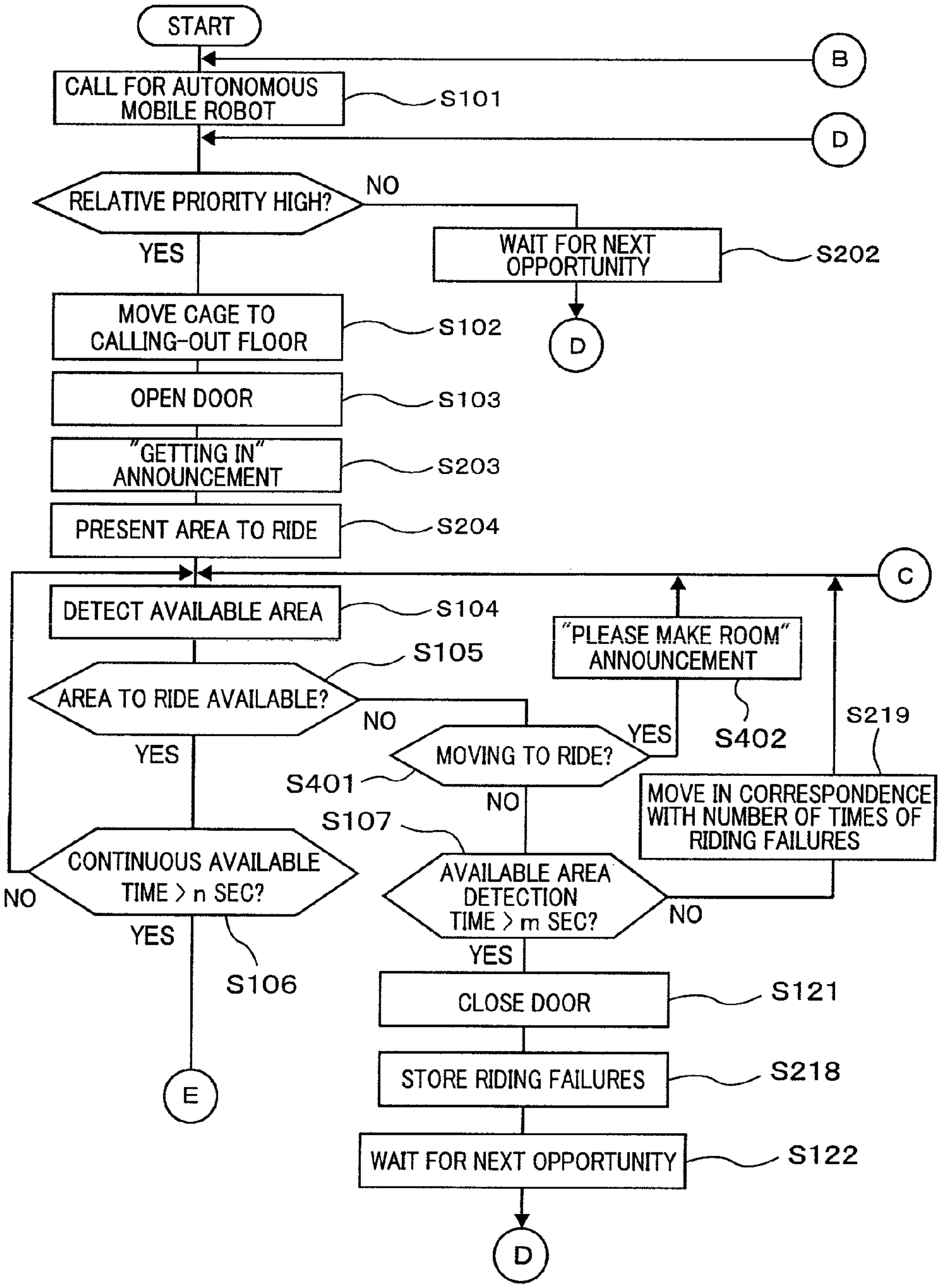
FIGS. 20A to 20D are flowcharts showing the flow of control in the elevator system according to the other embodiment of the present invention.

In FIG. 20A (only elements different from those in FIG. 10 will be described), when a calling-out request occurs from the autonomous mobile robot 20, the priority is determined (S201). When the priority is lower than the priorities of other conveyance tasks, the calling-out is not responded, until the priority becomes the same or higher than the priorities of the other conveyance tasks (S202).

When the cage door is opened at a calling-out floor, to increase the possibility of acquisition of riding area, announcement of riding is outputted (S203), and the floor in the riding area is irradiated with light to present the riding area (S204).

When it is determined at step S107 that a predetermined or longer period of time of available area detection has elapsed, the number of riding failures is stored (S218). Then the control is changed in correspondence with the stored number of riding failures (S219). For example, when the number of riding failures has been increased, the elevator controller 1 increases the time m at step S107. Further, information to increase the possibility of acquisition of riding area is presented as voice guidance or display on the display input unit 24. The information may include the number of riding failures, the significance of conveyance, and a particular position of the riding area. For example, announce "I have waited 5 times, I am in a hurry to deliver documents to the president. I will get on to a right front position, please make room." may be outputted.

Further, it may be arranged such that a unit to change the color of the entire case of the autonomous mobile robot 20 or a part of the case is provided, and the color is changed in correspondence with the number of riding failures. For example, in accordance with the increment in the number of riding failures, the reddish color is increased. The number of riding failures is reset to 0 when riding is successful.

Figure 20B:
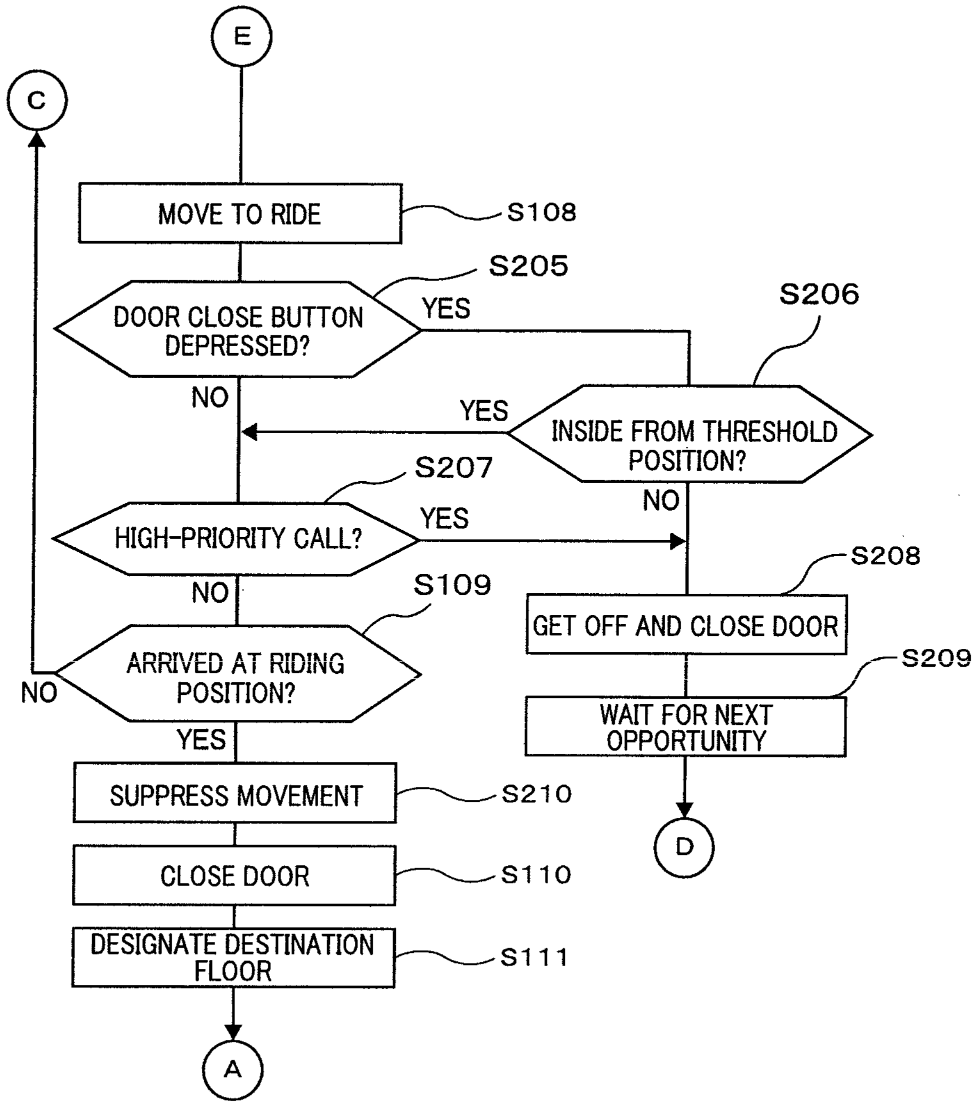

In FIG. 20B, when the autonomous mobile robot 20 once starts ride-moving (S108), depression of door close button during the movement is checked (S205). When the position of the autonomous mobile robot 20 upon depression of the door close button is on the cage side from a predetermined threshold value, the autonomous mobile robot 20 continues to move. The door is not closed until the movement is completed.

When the position of the autonomous mobile robot 20 is outside the threshold value, the elevator controller 1 instructs the autonomous mobile robot 20 by communication to get off, and when the autonomous mobile robot 20 gets off, then closes the door (S208). The autonomous mobile robot 20 that got off the elevator waits for arrival of the next cage at the floor (S209). With this arrangement, it is possible to prevent depression of the door close button by a user while the autonomous mobile robot 20 moving to ride and avoid breakage of the autonomous mobile robot 20 when wedged between the entrance/exit and the door. Further, a user who does not want to get on the elevator together with the autonomous mobile robot 20 can prevent the riding together with the autonomous mobile robot 20 by depressing the door close button at an initial stage.

Further, during the ride-moving, it is checked whether or not a high-priority calling out has occurred (S207). When it is determined that a high-priority calling out has occurred, the elevator controller 1 instructs the autonomous mobile robot 20 by communication to get off, and when the autonomous mobile robot 20 gets off, then closes the door (S208). The autonomous mobile robot 20 that got off the elevator waits for arrival of the next cage at the floor (S209).

When the autonomous mobile robot 20 arrives at the riding position 107 and stops there, movement suppression is performed (S210). When the movement suppression is performed, then the door is closed (S110), movement of the cage to a destination floor is started. When the movement suppression is started in accordance with door closing or moving up operation as in the case of the moving suppression unit shown in FIGS. 18 and 19, step S210 is omitted.

Figure 20C:
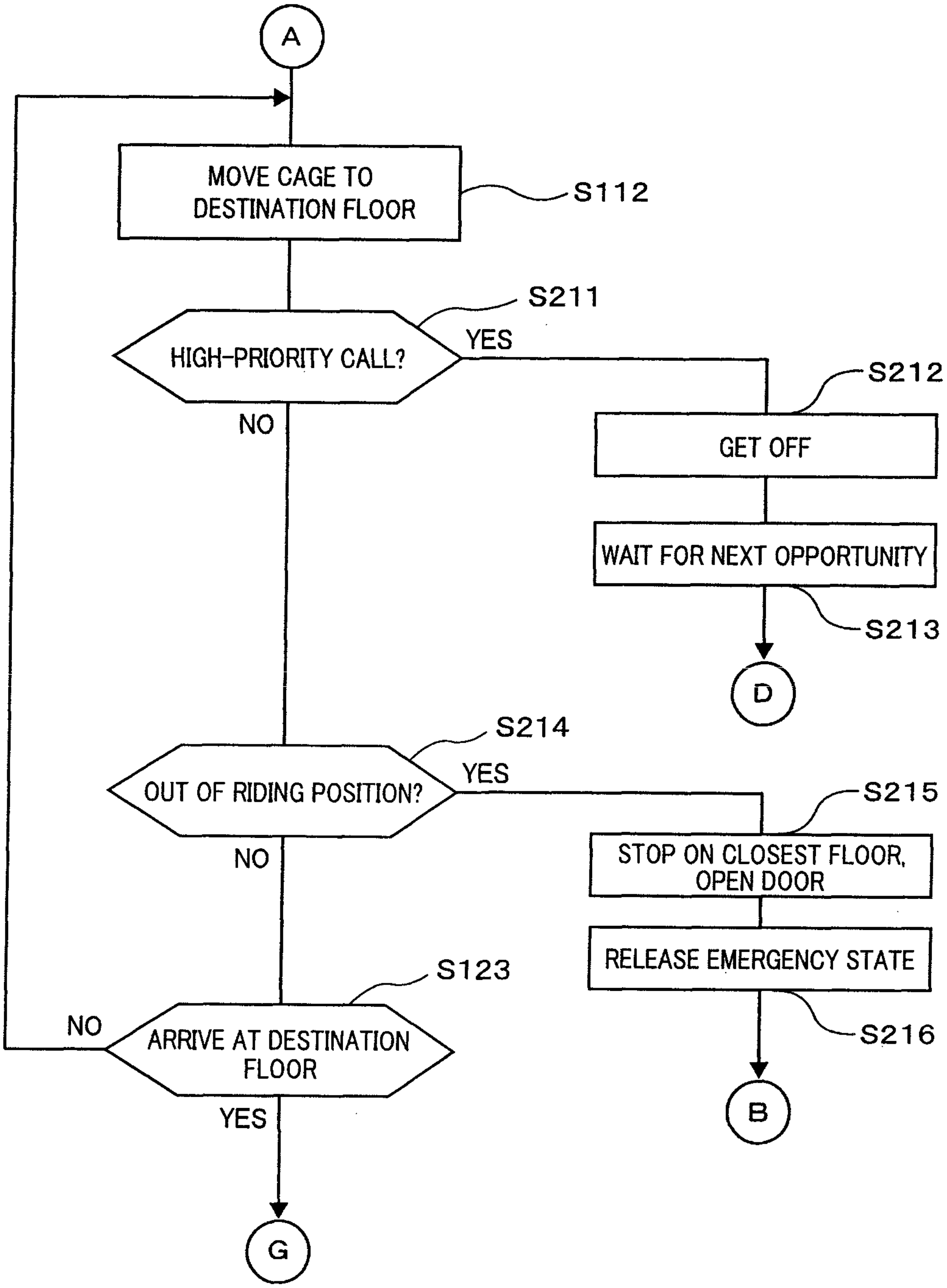

In FIG. 20C, during the upward movement of the cage to the destination floor, it is always checked whether or not high-priority calling out has occurred (S211). When it is determined that high-priority calling out has occurred, the priority control is performed. The autonomous mobile robot 20 gets off from the cage in accordance with necessity (S212), and waits for the next opportunity (S213).

Figure 20D:
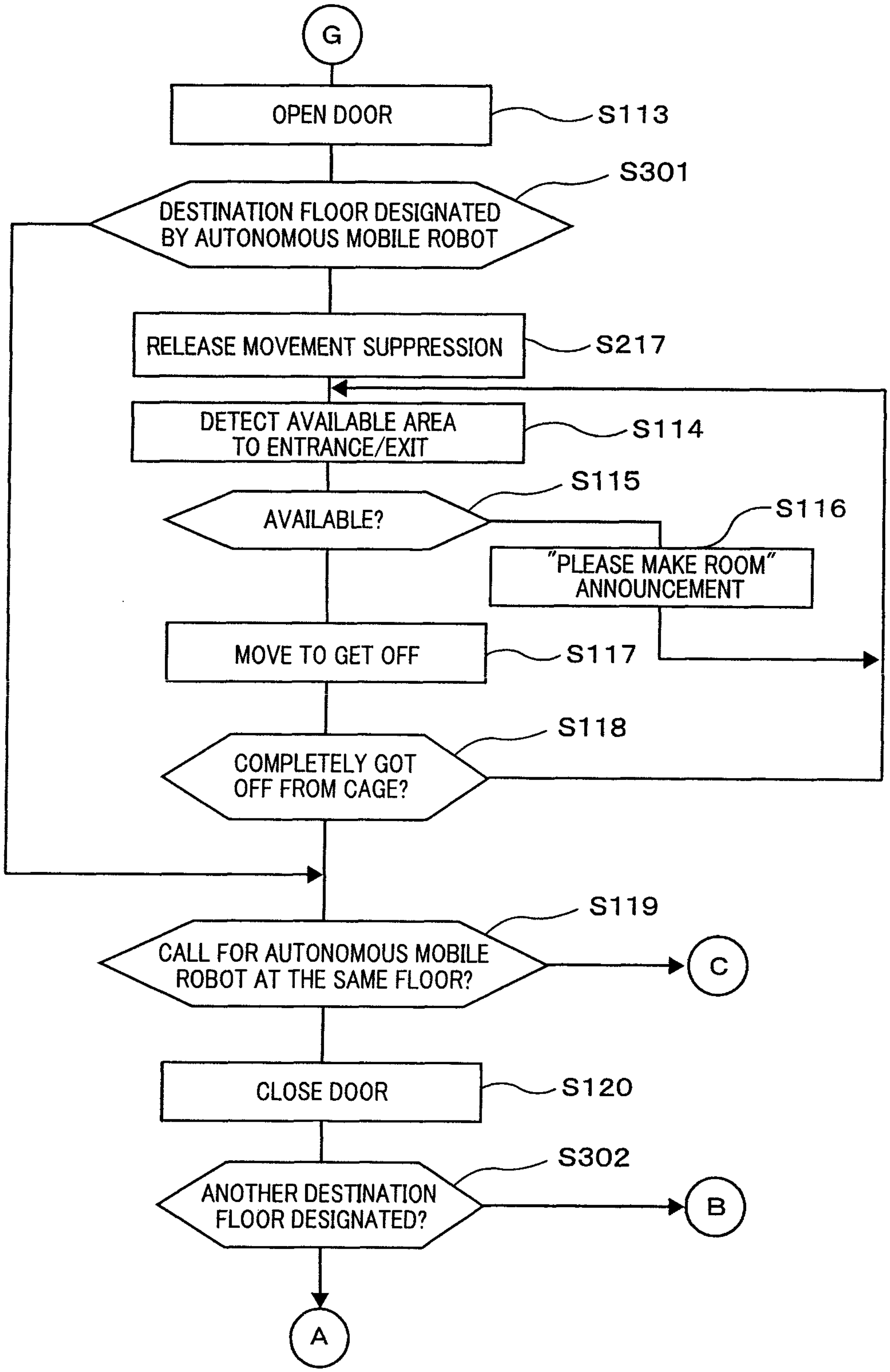

In FIG. 20D, when the cage 2 arrives at the destination floor, first, the door is opened (S118), then, the movement suppression is released (S217). When the movement suppression is released in accordance with door closing or moving up operation as in the case of the moving suppression unit shown in FIGS. 18 and 19, step S217 is omitted.

As described above, it is possible to provide an elevator system in which the autonomous mobile robot 20 and human user can get on an elevator safely and efficiently.

As described above, according to the present invention, as the autonomous mobile robot and other user can take the same elevator with sufficient distance therebetween, the safety is improved. Further, since it is possible to prevent an accident that causes breakage of the autonomous mobile robot when wedged between the entrance/exit and the door, the safety is improved.

Even in case of overdrive of the driving unit of the autonomous mobile robot, the movement of the autonomous mobile robot is suppressed with the moving suppression unit. Further, even when the driving force is higher than the suppression force and the autonomous mobile robot starts to move, as the cage is stopped at the closest floor and the door is opened, other user(s) can get off from the cage, thus the safety is ensured. Further, when multiple elevators are arrayed, separate riding for the autonomous mobile robot and human user can be expected, thus further safety is ensured.

Further, as the both autonomous mobile robot and human user can designate priority, the conveyance efficiency of a high-emergency conveyance task can be increased.

Further, in a case where there are many users and the autonomous mobile robot continuously cannot get on an elevator since a riding area cannot be ensured, a control method is changed to another method to increase the possibility to ensure the riding area for the autonomous mobile robot. Accordingly, it is possible to prevent extreme reduction of conveyance efficiency of the autonomous mobile robot.

With the above-describe arrangements, it is possible to realize efficient conveyance of both of the autonomous mobile robot and human user while ensuring safety.

What is claimed is:

1. An elevator system that an autonomous mobile robot takes together with a person, comprising:

the autonomous mobile robot having:

a self position recognition unit that recognizes a current self position;

a mobile unit that both generates a route to a destination based on self position information recognized by the self position recognition unit, and moves by driving a mobile mechanism; and an autonomous mobile controller that controls respective units in the autonomous mobile robot; and a plurality of elevators disposed side by side, each of the elevator having:

a cage ascent/decent unit that moves a cage up/down;

a door that opens/closes an entrance of the cage;

a designation floor designation unit that designates a destination of the cage; and a calling-out unit that calls out the cage to a floor designated by the destination floor designation unit;

the elevator system further comprising:

an elevator controller that controls respective units of the plurality of the elevators;

a communication unit for communication between the plurality of elevators and the autonomous mobile robot that transmits/receives information including at least one of designated floors as a destination of the autonomous mobile robot, wherein the autonomous mobile robot further comprises a elevator communication unit for communication with the elevator that transmits/receives information including at least one of designated floors as a destination of the autonomous mobile robot;

a riding area presentation unit that presents a moving range of the autonomous mobile robot in the cage to the passenger before the autonomous mobile robot gets in the cage in advance;

an available area detection unit that detects an available area in the cage; and a riding possibility/impossibility determination unit that determines whether or not the autonomous mobile robot can get on the cage based on information on size and position of the available area detected by the available area detection unit, wherein if a calling out request from the autonomous mobile robot and a calling out request from the calling out unit are generated to the same floor, the elevator controller controls a plurality of cages to reach the same calling out floor at substantially the same time, and wherein the autonomous mobile controller controls the autonomous mobile robot to get on the cage which arrives later than another of the cages, and only when the riding possibility/impossibility determination unit determines that riding being possible.

2. The elevator system that the autonomous mobile robot takes together with person according to claim 1, wherein a moving suppression unit that suppresses movement of the autonomous mobile robot is provided in the cage, the moving suppression unit suppresses movement of the autonomous mobile robot while the cage is moved up, and the moving suppression unit performs start of movement suppression and release of movement suppression by opening/closing operation of the door.

3. The elevator system that the autonomous mobile robot takes together with person according to claim 1, wherein the plurality of elevators are arrayed, and wherein when a calling-out request from the autonomous mobile robot and a calling-out request by the calling-out unit occur on the same floor, the elevator controller controls the cage ascent/descent unit to move a plurality of cages to arrive at a corresponding floor almost simultaneously, and further wherein the autonomous mobile controller controls the autonomous mobile robot to get on one of the cages which arrives later than another of the cages.

4. The elevator system that the autonomous mobile robot takes together with person according to claim 1, wherein, when the riding possibility/impossibility determination unit does not determine that riding is possible within a predetermined period, the autonomous mobile robot cancels riding judging as being incapable to ride, a riding failures storage unit that stores the number of riding failures is provided, and any one or both of the elevator controller and the autonomous movement controller changes a control method to increase a possibility that the riding area for the autonomous mobile robot can be ensured based on the number of riding failures from the riding failures storage unit.

5. An elevator system that autonomous mobile robot takes together with a person, comprising:

the autonomous mobile robot having:

a self position recognition unit that recognizes a current self position;

a mobile unit that both generates a route to a destination based on self position information recognized by the self position recognition unit and moves by driving a mobile mechanism; and an autonomous mobile controller that controls respective units in the autonomous mobile robot; and an elevator having:

a cage ascent/decent unit that moves a cage up/down;

a door that opens/closes an entrance of the cage;

a destination floor designation unit that designates a destination of the cage;

a calling-out unit that calls out the cage to a floor designated by the destination floor designation unit;

an elevator controller that controls respective units of the elevator, characterized in that a plurality of elevators is arrayed and the elevator system further comprises:

a communication unit that transmits/receives information between the autonomous robot and the plurality of elevators responding to the calling-out request from the autonomous mobile robot to the cage, the information including at least one of the designated floors as a destination of the autonomous mobile robot;

a riding area presentation unit that provides an advance indication of a moving range of the autonomous mobile robot to the person in the cage;

an available area detection unit that detects an available area in the cage; and a riding possibility/impossibility determination unit that determines whether or not the autonomous mobile robot can get on the cage based on information on size and position of the available area detected by the available area detection unit, wherein when a calling-out request from the autonomous mobile robot and a calling-out request by the calling-out unit occur on the same floor, the elevator controller controls the cage ascent/descent unit to move a plurality of cages to arrive at a corresponding floor almost simultaneously, further wherein the autonomous mobile robot gets on one of the cages that arrives behind only when the riding possibility/impossibility determination unit determines that riding is possible.

6. The elevator system that autonomous mobile robot takes together with person according to claim 5, further comprising: a getting on/off status detection unit that always detects detailed positional status of the autonomous mobile robot when the autonomous mobile robot moves to get on/off the cage, wherein when the autonomous mobile robot is in a door opening/closing position, the elevator controller controls a door opening/closing unit not to close the door based on information from the getting on/off status detection unit.

7. The elevator system that autonomous mobile robot takes together with person according to claim 6, wherein the getting on/off status detection unit always detects the details positional status of the autonomous mobile robot even when the cage is moved up, and wherein when it is determined that the position of the autonomous mobile robot is changed based on the information from the getting on/off status detection unit while the cage is moved up, the elevator controller controls the cage ascent/descent unit to stop the cage at the closest floor, and then open the door at the closest floor.

8. The elevator system that autonomous mobile robot takes together with person according to claim 5, wherein a moving suppression unit that suppresses movement of the autonomous mobile robot is provided in the cage, and wherein the moving suppression unit suppresses movement of the autonomous mobile robot while the cage is moved up.

9. The elevator system that autonomous mobile robot takes together with person according to claim 8, wherein the moving suppression unit performs start of movement suppression and release of movement suppression by opening/closing operation of the door.

10. The elevator system that autonomous mobile robot takes together with person according to claim 8, wherein the moving suppression unit performs the start of movement suppression and the release of movement suppression by an upward/downward acceleration/deceleration force of the cage.

11. The elevator system that autonomous mobile robot takes together with person according to claim 5, wherein at least one priority is set for a calling-out request and destination floor designation for the autonomous mobile robot, the calling-out request by the calling-out unit and the destination floor designation by the destination floor designation unit, and wherein when the priority of the calling-out request by the calling-out unit or the destination floor designation by the destination floor designation unit is higher than the priority of the calling-out request or the destination floor designation for the autonomous mobile robot, the autonomous mobile robot does not get on the cage.

12. The elevator system that autonomous mobile robot takes together with person according to claim 11, wherein any one or both of the calling-out unit and the destination floor designation unit are push buttons, a priority detection unit that detects the number of continuous depression times of the push button is provided, and the priority of the calling-out request or the destination floor designation is designated based on the number of continuous depression times detected by the priority detection unit.

13. The elevator system that autonomous mobile robot takes together with person according to claim 5, wherein, when the riding possibility/impossibility determination unit does not determine that riding is possible within a predetermined period; the autonomous mobile robot cancels riding so that the riding is impossible; a riding failures storage unit that stores the number of riding failures is provided; and when the number of riding failures stored at the riding failure storage is increased, the elevator controller improves the possibility of riding by controlling at least one of elongating the detecting time for the available area, presenting by the audio or display means to secure the riding area, and changing a case color of the autonomous mobile robot.

* * * * *